(12) United States Patent
Picking

(10) Patent No.: US 9,923,590 B1
(45) Date of Patent: Mar. 20, 2018

(54) PACK ASSEMBLY FOR A MOBILE DEVICE

(71) Applicant: UVu, LLC, Phoenix, AZ (US)

(72) Inventor: Karl D. Picking, Gardenville, NV (US)

(73) Assignee: UVu, LLC, Phoenix, AZ (US)

( * ) Notice: Subject to any disclaimer, the term of this patent is extended or adjusted under 35 U.S.C. 154(b) by 0 days.

(21) Appl. No.: 15/256,536

(22) Filed: Sep. 3, 2016

Related U.S. Application Data

(60) Provisional application No. 62/214,132, filed on Sep. 3, 2015.

(51) Int. Cl.
```
H04M 1/00      (2006.01)
H04B 1/3827    (2015.01)
A45F 3/14      (2006.01)
A45F 5/00      (2006.01)
```

(52) U.S. Cl.
CPC ........... *H04B 1/385* (2013.01); *A45F 3/14* (2013.01); *A45F 5/00* (2013.01); *A45F 2003/146* (2013.01); *H04B 2001/3855* (2013.01)

(58) Field of Classification Search
USPC .............. 455/575.6, 550.1, 556.1, 575.1
See application file for complete search history.

(56) References Cited

U.S. PATENT DOCUMENTS

| | | | | |
|---|---|---|---|---|
| 4,320,863 A * | 3/1982 | Lyer | | A45F 3/14 224/259 |
| 4,461,411 A * | 7/1984 | Harrow | | A45F 5/00 224/258 |
| 5,323,942 A * | 6/1994 | Dahan | | A45C 11/38 224/639 |
| 8,418,264 B2 | 4/2013 | Alexander | | |
| 8,960,511 B2 * | 2/2015 | Shepherd | | A45C 3/00 224/259 |
| 8,984,666 B1 | 3/2015 | Lobue | | |
| 9,244,337 B2 * | 1/2016 | Weihe | | G03B 17/561 |
| 2010/0116860 A1 * | 5/2010 | Tello | | A45F 3/04 224/576 |
| 2012/0144557 A1 | 6/2012 | Walker | | |
| 2012/0185999 A1 | 7/2012 | Raviv | | |
| 2012/0186000 A1 | 7/2012 | Raviv | | |
| 2012/0267409 A1 * | 10/2012 | Chavis | | A45F 5/00 224/579 |
| 2013/0004153 A1 * | 1/2013 | McKee | | F16M 11/041 396/420 |

(Continued)

FOREIGN PATENT DOCUMENTS

WO       WO 2012151200 A1 * 11/2012 ............... A45F 3/14

*Primary Examiner* — Fayyaz Alam
(74) *Attorney, Agent, or Firm* — Quarles & Brady LLP

(57) ABSTRACT

A wearable pack assembly includes a pack carried by a base of a harness. The pack includes an opening to a windowed pocket for receiving a mobile device, having a touchscreen and a camera, through the opening so as to juxtapose the touchscreen and the camera with the windowed pocket to enable the viewing and the touching of the touchscreen and the taking of pictures and video with the camera in the operation of the mobile device from the windowed pocket. The base is configured to be positioned against a chest of an upper torso of a wearer for holding the pack ahead of the chest of the upper torso of the wearer with the windowed pocket facing outwardly relative to the chest of the upper torso of the wearer, when the harness is worn by the upper torso of the wearer.

31 Claims, 16 Drawing Sheets

(56) References Cited

U.S. PATENT DOCUMENTS

| | | | |
|---|---|---|---|
| 2013/0256346 A1* | 10/2013 | Rohrbach | A45F 5/00 224/222 |
| 2013/0342969 A1* | 12/2013 | Krupich | A45F 5/00 361/679.01 |
| 2014/0082814 A1 | 3/2014 | Rober et al. | |
| 2015/0060506 A1* | 3/2015 | Cameron | A45C 11/00 224/267 |
| 2015/0074866 A1 | 3/2015 | Diakite | |
| 2015/0150359 A1* | 6/2015 | Lowry | A45F 5/00 224/222 |
| 2015/0208789 A1* | 7/2015 | Pylkovas | A45F 3/02 224/607 |
| 2017/0055683 A1* | 3/2017 | Willows | A45F 3/14 |
| 2017/0142299 A1* | 5/2017 | Brown | G06F 1/163 |

\* cited by examiner

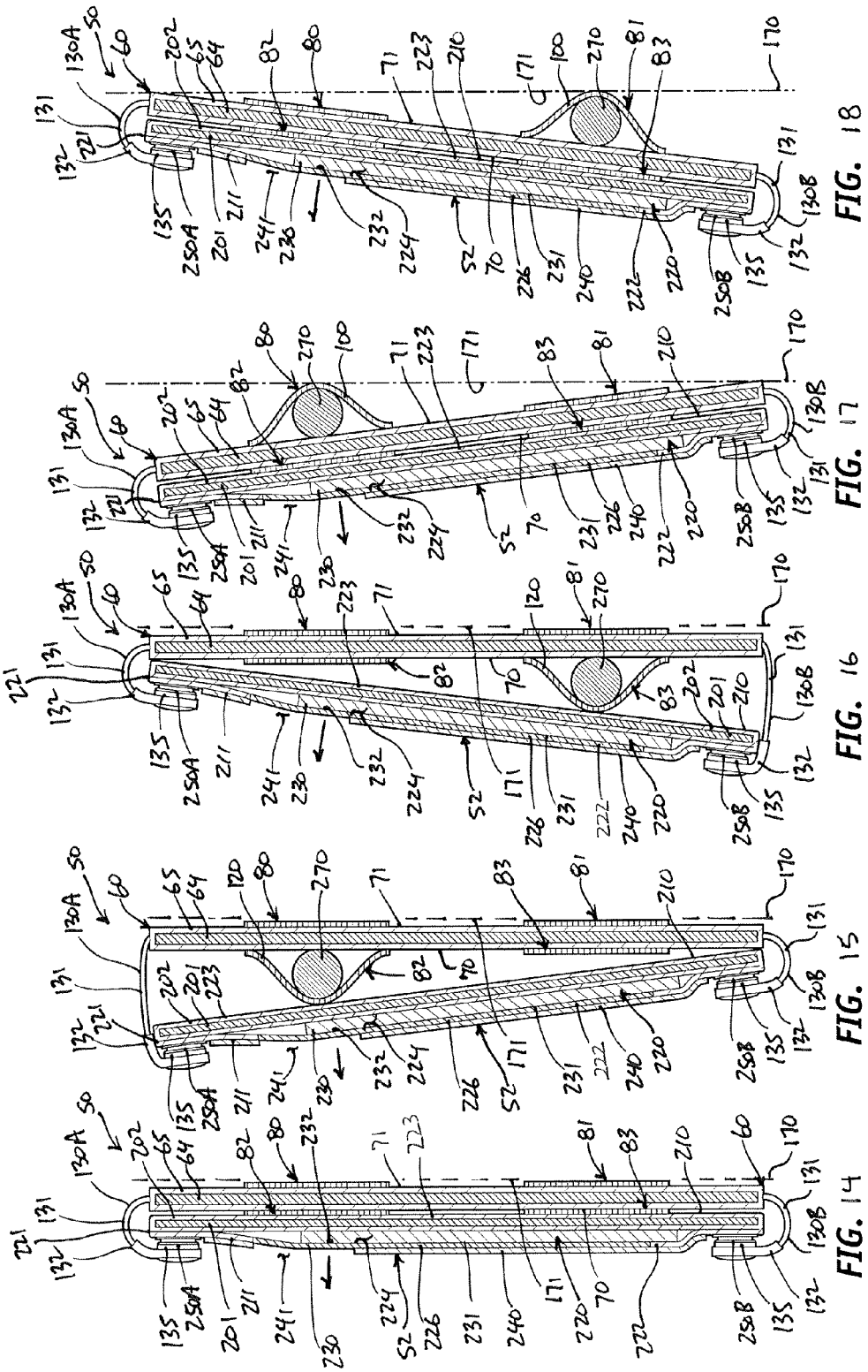

PACK ASSEMBLY FOR A MOBILE DEVICE

CROSS-REFERENCE TO RELATED APPLICATION

This application claims the benefit of U.S. Provisional Patent Application No. 62/214,132, filed Sep. 3, 2015, the entire contents of which are incorporated herein by reference.

FIELD OF THE INVENTION

The present invention relates to mobile devices and, more particularly, to a wearable pack assembly useful for holding a mobile device having a camera for employing the camera of the mobile device as a body camera for recording the wearer's interactions with the environment and others.

BACKGROUND OF THE INVENTION

A body camera is a body-worn camera useful for recording the wearer's interactions with the environment and others. There are a variety of exemplary body cameras known in the art, the popularity of which has risen in recent years amongst outdoor enthusiasts and law enforcement personnel who use the technology to record their outdoor and law enforcement activities. Although body cameras are useful and popular, they are expensive, bulky, cumbersome when worn, and single-purpose, having no other use other than recording video.

The technology of mobile devices has advanced significantly in recent years. Of particular significance are the improvements in mobile device cameras, which are capable of taking high-definition and high-quality pictures and video. In view of the inherent expensive and single-purpose characteristics of dedicated body cameras, and the inherent multi-purpose functionality of mobile devices, users have begun to use their mobile devices to take pictures and videos of their activities. Typically, the user will hold and operate the mobile device by hand for taking pictures and video during a given activity. However, operating the mobile device by hand while performing an activity is inherently distracting and routinely results in accidents resulting in bodily injury and, in some cases, even death. Mobile devices are often dropped and damaged as well. Given these and other deficiencies in the art, there is a need for a wearable useful with a mobile device for enabling a user to take pictures and video with the mobile device without the need to hold the mobile device by hand and which also protects the mobile device from becoming dropped and damaged from exposure to external influences.

SUMMARY OF THE INVENTION

According to the principle of the invention, a wearable pack assembly for a mobile device includes a harness, and a pack. The harness includes a base. The pack is carried by the base. The pack includes a windowed pocket and an opening to the windowed pocket. The windowed pocket is for receiving a mobile device, having a touchscreen and a camera, through the opening to the windowed pocket so as to juxtapose the touchscreen and the camera with the windowed pocket to enable the viewing and the touching of the touchscreen and the taking of pictures and video with the camera in the operation of the mobile device from the windowed pocket. The base is configured to be positioned against a chest of an upper torso of a wearer for holding the pack ahead of the chest of the upper torso of the wearer with the windowed pocket facing outwardly relative to the chest of the upper torso of the wearer, when the harness is worn by the upper torso of the wearer. The pack further includes a door having a window, the door is movable between an open position away from the windowed pocket and a closed position over the windowed pocket. The door covers the windowed pocket over the touchscreen of the mobile device and the window of the door and the windowed pocket are juxtaposed enabling the taking of pictures and video with the camera from the window of the door and the windowed pocket, when the door is in the closed position, when the mobile device is received in the windowed pocket, and when the touchscreen and the camera are juxtaposed with the windowed pocket. An engagement assembly removably couples the pack to the base. The engagement assembly includes flaps carried by the base, and fasteners releasably securing the flaps to the pack. One of the flaps closes the opening to the windowed pocket. Each of the fasteners is a snap closure. An outer spacer is carried by the base. The outer spacer is configured to interact between the base and the chest of the upper torso of the wearer for concurrently tipping the base and the pack upwardly or downwardly relative to the chest of the upper torso of the wearer, when the harness is worn by the upper torso of the wearer. The base further includes an outer sleeve, and the outer spacer is held by the outer sleeve. In another embodiment, an inner spacer is between the base and the windowed pocket. The inner spacer interacts between the base and the pocket tipping the pocket upwardly or downwardly relative to the base. The inner spacer is carried by the base. The base further includes an inner sleeve, and the inner spacer is held by the inner sleeve.

According to the principle of the invention, a wearable pack assembly for a mobile device includes a harness, and a pack. The harness includes a base having an inner side and an opposed outer side, and a peripheral edge. The pack includes an inner side and an opposed outer side, a windowed pocket formed in the inner side, an opening to the windowed pocket, and a peripheral edge. The windowed pocket is for receiving a mobile device, having a touchscreen and a camera, through the opening to the windowed pocket so as to juxtapose the touchscreen and the camera with the windowed pocket to enable the viewing and the touching of the touchscreen and the taking of pictures and video with the camera in the operation of the mobile device from the windowed pocket. The inner side of the pack is superimposed atop the inner side of the base, and the peripheral edges of the respective pack is base are juxtaposed. An engagement assembly removable couples the pack to the base. The outer surface of the base is configured to be positioned against a chest of an upper torso of a wearer for holding the pack ahead of the chest of the upper torso of the wearer with the windowed pocket facing outwardly relative to the chest of the upper torso of the wearer, when the harness is worn by the upper torso of the wearer. A door is mounted to the pack for movement between an open position away from the windowed pocket and a closed position over the windowed pocket. The door covers the windowed pocket over the touchscreen of the mobile device and the window of the door and the windowed pocket are juxtaposed enabling the taking of pictures and video with the camera from the window of the door and the windowed pocket, when the door is in the closed position, when the mobile device is received in the windowed pocket, and when the touchscreen and the camera are juxtaposed with the windowed pocket. There is a latch for releasably securing the door to the pack when the door is in the closed position. The latch assembly includes a hook and loop fastener having an element thereof carried by door and a complemental element thereof carried by the pack. The engagement assembly includes flaps carried by the base, each of the flaps is elastic and extends over the peripheral edge of the pack from the base to the outer side of the pack, and fasteners releasably securing the flaps to the outer side of the pack. One of the flaps closes the opening to the windowed pocket. Each of the fasteners is a snap closure. An outer spacer carried by the base. The outer spacer extends outwardly from the outer side of the base and is configured to interact between the base and the chest of the upper torso of the wearer for concurrently tipping the base and the windowed pocket upwardly or downwardly relative to the chest of the upper torso of the wearer, when the harness is worn by the upper torso of the wearer. The outer spacer is held against the outer side of the base with an elastic strap coupled to the outer side of the base. In another embodiment, an inner spacer is between the inner side of the pack and the inner side of the base. The inner spacer interacts between the inner side of the pack and the inner side of the base tipping the pack upwardly or downwardly relative to the base. The inner spacer is carried by the base. The inner spacer is held against the inner side of the base with an elastic strap coupled to the inner side of the base.

According to the principle of the invention, a wearable pack assembly for a mobile device includes a harness, and a pack. The harness includes a base including an inner side and an opposed outer side, and a peripheral edge defined by a first end edge and an opposed second end edge, and a first side edge and an opposed second side edge that extend from the first end edge to the second end edge. The pack includes an inner side and an opposed outer side, a windowed pocket formed in the inner side, an opening to the windowed pocket, and a peripheral edge defined by a first end edge and an opposed second end edge, and a first side edge and an opposed second side edge that extend from the first end edge to the end second extremity. The windowed pocket is for receiving a mobile device, having a touchscreen and a camera, through the opening to the windowed pocket so as to juxtapose the touchscreen and the camera with the windowed pocket to enable the viewing and the touching of the touchscreen and the taking of pictures and video with the camera in the operation of the mobile device from the windowed pocket. The inner side of the pack is superimposed atop the inner side of the base, the first end edge of the pack and the first end edge of the base are juxtaposed, the second end edge of the pack and the second end edge of the base are juxtaposed, the first side edge of the pack and the first side edge of the base are juxtaposed, and the second side edge of the pack and the second side edge of the base are juxtaposed. The base further includes flaps. Each of the flaps is elastic. A first one of the flaps extends over the first end edge of the pack from the first end edge of the base to the outer side of the pack outboard of the windowed pocket, a second one of the flaps extends over the second end edge of the pack from the second end edge of the base to the outer side of the pack outboard of the windowed pocket, a third one of the flaps extends over the first side edge of the pack from the first side edge of the base to the outer side of the pack outboard of the windowed pocket, and a fourth one of the flaps extends over the second side edge of the pack from the second side edge of the base to the outer side of the pack outboard of the windowed pocket. Fasteners releasably secure the first, second, third, and fourth flaps to the outer side of the pack outboard of the windowed pocket. The outer surface of the base is configured to be positioned against a chest of an upper torso of a wearer for holding the pack ahead of the chest of the upper torso of the wearer with the windowed pocket facing outwardly relative to the chest of the upper torso of the wearer, when the harness is worn by the upper torso of the wearer. The first one of the flaps closes the opening to the windowed pocket. Each of the fasteners is a snap closure. A door is mounted to the pack for movement between an open position away from the windowed pocket and a closed position over the windowed pocket. The door covers the windowed pocket over the touchscreen of the mobile device and the window of the door and the windowed pocket are juxtaposed enabling the taking of pictures and video with the camera from the window of the door and the windowed pocket, when the door is in the closed position, when the mobile device is received in the windowed pocket, and when the touchscreen and the camera are juxtaposed with the windowed pocket. There is a latch for releasably securing the door to the pack when the door is in the closed position. The latch assembly includes a hook and loop fastener having an element thereof carried by door and a complemental element thereof carried by the pack. An outer spacer carried by the base. The outer spacer extends outwardly from the outer side of the base and is configured to interact between the base and the chest of the upper torso of the wearer for concurrently tipping the base and the windowed pocket upwardly relative to the chest of the upper torso of the wearer, the first one of the flaps being elastically constricted and the second one of the flaps being elastically extended in response, when the harness is worn by the upper torso of the wearer. The outer spacer is held against the outer side of the base with an elastic strap coupled to the outer side of the base. In another embodiment, an inner spacer is between the inner side of the pack and the inner side of the base. The inner spacer interacts between the inner side of the pack and the inner side of the base tipping the pack upwardly relative to the base, the first one of the flaps being elastically constricted and the second one of the flaps being elastically extended in response. The inner spacer is carried by the base. The inner spacer is held against the inner side of the base with an elastic strap coupled to the inner side of the base.

Consistent with the foregoing summary of illustrative embodiments, and the ensuing detailed description, which are to be taken together, the invention also contemplates associated apparatus and method embodiments.

BRIEF DESCRIPTION OF THE DRAWINGS

Referring to the drawings:

FIG. 14 is a section view taken along line 14-14 of FIG. 11;

FIG. 15 is a view corresponding to FIG. 14 illustrating a spacer between the pack and the base of the harness tipping the pack downwardly relative to the base, the spacer being held within the upper inner sleeve of the base first illustrated in FIG. 2;

FIG. 16 is a view corresponding to FIG. 15 illustrating the spacer between the pack and the base of the harness tipping the pack upwardly relative to the base, the spacer being held within the lower inner sleeve of the base first illustrated in FIG. 2;

FIG. 17 is a view corresponding to FIG. 16 illustrating the spacer held within the upper outer sleeve of the base first illustrated in FIG. 3, the spacer for interacting between the base and a chest of an upper torso of a wearer for concurrently tipping the base and the pack downwardly relative to the chest of the upper torso of the wearer, when the harness is worn by the upper torso of the wearer;

FIG. 18 is a view corresponding to FIG. 17 illustrating the spacer held within the lower outer sleeve of the base first illustrated in FIG. 3, the spacer for interacting between the base and a chest of an upper torso of a wearer for concurrently tipping the base and the pack upwardly relative to the chest of the upper torso of the wearer, when the harness is worn by the upper torso of the wearer;

DETAILED DESCRIPTION

Figure 1:
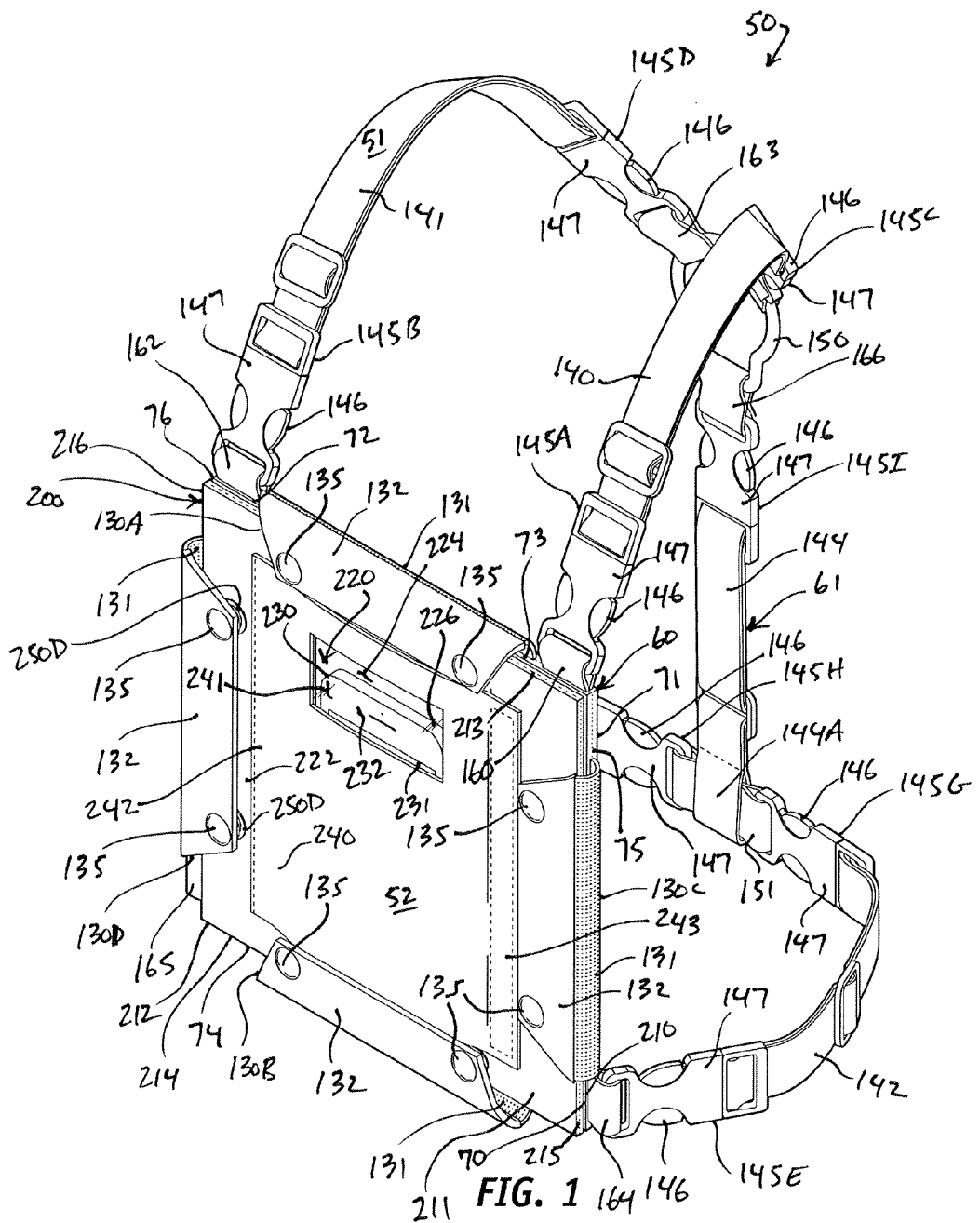
FIG. 1 is a front perspective view of a wearable pack assembly for a mobile device, the wearable pack assembly includes a harness having a base, and a pack carried by a base.

Turning now to the drawings, in which like reference characters indicate corresponding elements throughout the several views, attention is first directed to FIG. 1 in which there is seen a wearable pack assembly 50 for a mobile device. The term "mobile device" means a small computing device, typically small enough to be handheld, having a touchscreen, a display screen with touch input, and a camera. Such exemplary and ubiquitous known mobile devices include smartphones or mobile phones with an advanced mobile operating system that combines features of a personal computer operating system with other features useful for mobile or handheld use. Such mobile devices are usually pocket-sized, include features of a cell phone, such as the ability to receive and make phone calls and text messages, are enabled to access the Internet, and, again, include a graphical user interface in the nature of a touchscreen, and a camera for taking videos and still pictures.

Pack assembly 50 includes a harness 51, and a pack 52. Harness 51 is a wearable, and pack 52 is configured to be carried by harness 51, and is shown as it would appear being carried by harness 51 in FIGS. 1 and 2. Pack 51 includes a windowed pocket 220 for receiving a mobile device through an opening to windowed pocket 220 so as to juxtapose a touchscreen and a camera of the mobile device with the windowed pocket to enable the viewing and the touching of the touchscreen and the taking of pictures and video with the camera in the operation of the mobile device from windowed pocket 220. Harness 51 is configured to hold pack 52 ahead of a chest of an upper torso of a wearer with windowed pocket 220 facing outwardly relative to the chest of the upper torso of the wearer when harness 51 is worn by the upper torso of the wearer and when pack 52 is carried by harness 51 for enabling the wearer to usefully employ the camera of the mobile device as a body camera for recording a wearer's interactions with the environment when the mobile device is carried operatively by the pack 52.

§ I. The Harness

Figure 2:
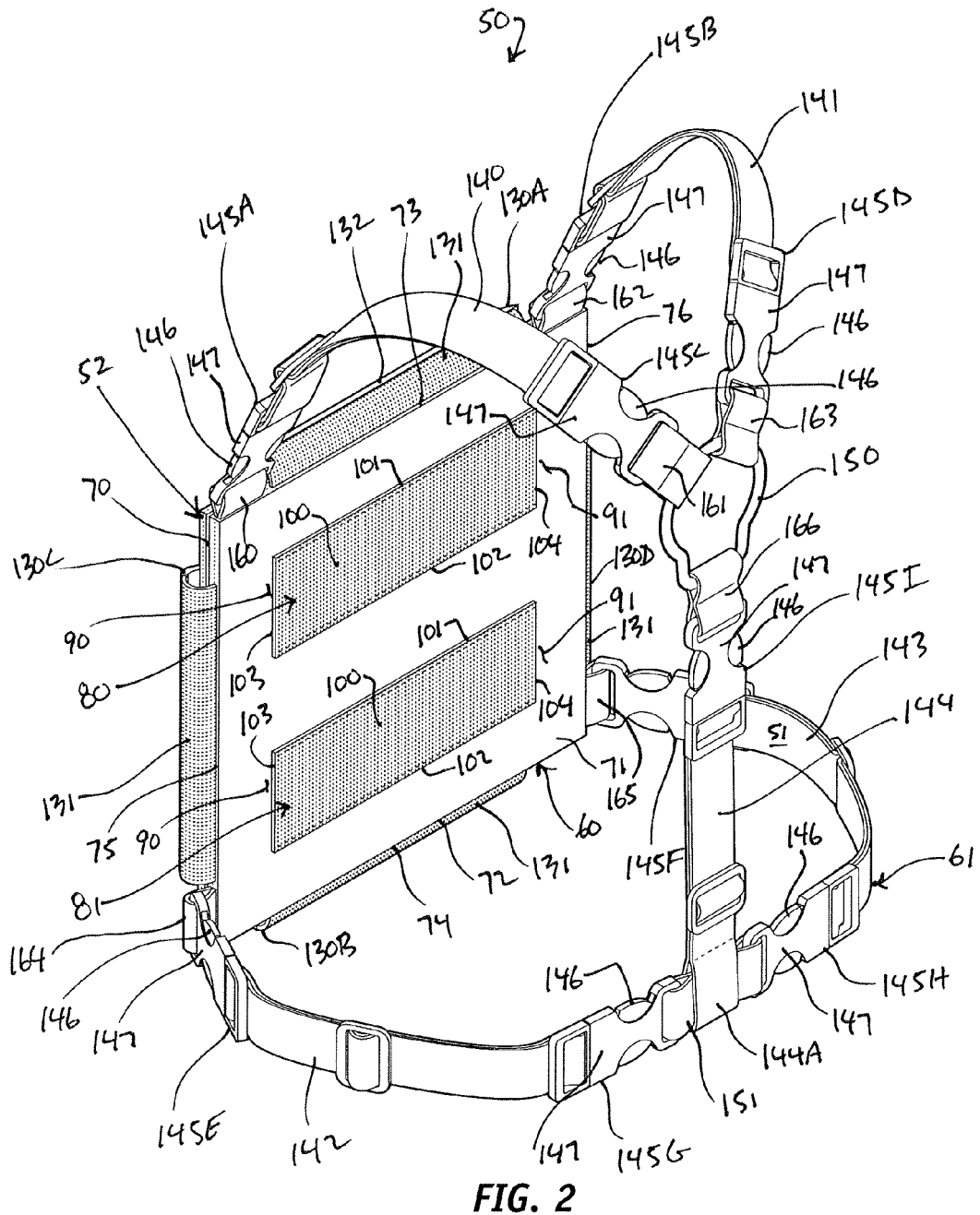
FIG. 2 is rear perspective view of the embodiment of FIG. 1 illustrating upper and lower outer sleeves formed on an outer side of the base.

Referring to FIGS. 1 and 2, harness 51 includes base 60, and strap assembly or system 61. Base 60 is flat and generally square in overall shape. Base 60 is a panel assembly including, as seen in FIGS. 14-18, panel 64 is covered with outer layering 65 consisting of one or more layers of material. Panel 64 is fashioned of plastic, wood, metal, or other material or combination of materials having an inherently stiff material characteristic, being inherently rigid or firm and resistant to bending. Outer layering 65 is fashioned of leather, tightly woven nylon, canvas, or other material or combination of materials having the inherent properties of flexibility, resilience, tear-resistance, and ruggedness. Panel 64 is upholstered with outer layering 65, which encloses panel 64 and defines the major sides and peripheral edge of base 60 as described below.

Referring in relevant part to FIGS. 1-6, base 60 includes inner side 70 and opposed outer side 71, and peripheral edge 72. Peripheral edge 72 is defined by first end edge 73 and opposed second end edge 74, and first side edge 75 and opposed second side edge 76 that extend from the first end edge 73 to second end edge 74. First end edges 73 and 74 are parallel with respect to each other, and first and second side edges 75 and 76 are parallel with respect to each other and are orthogonal with respect to first and second end edges 73 and 74. Base 60 has a length from first end edge 73 to second end edge 74 and a width from first side edge 75 to second side edge 76, and the length of base 60 and the width of base 60 are substantially the same characterizing the generally square shape of base 60.

Figure 3:
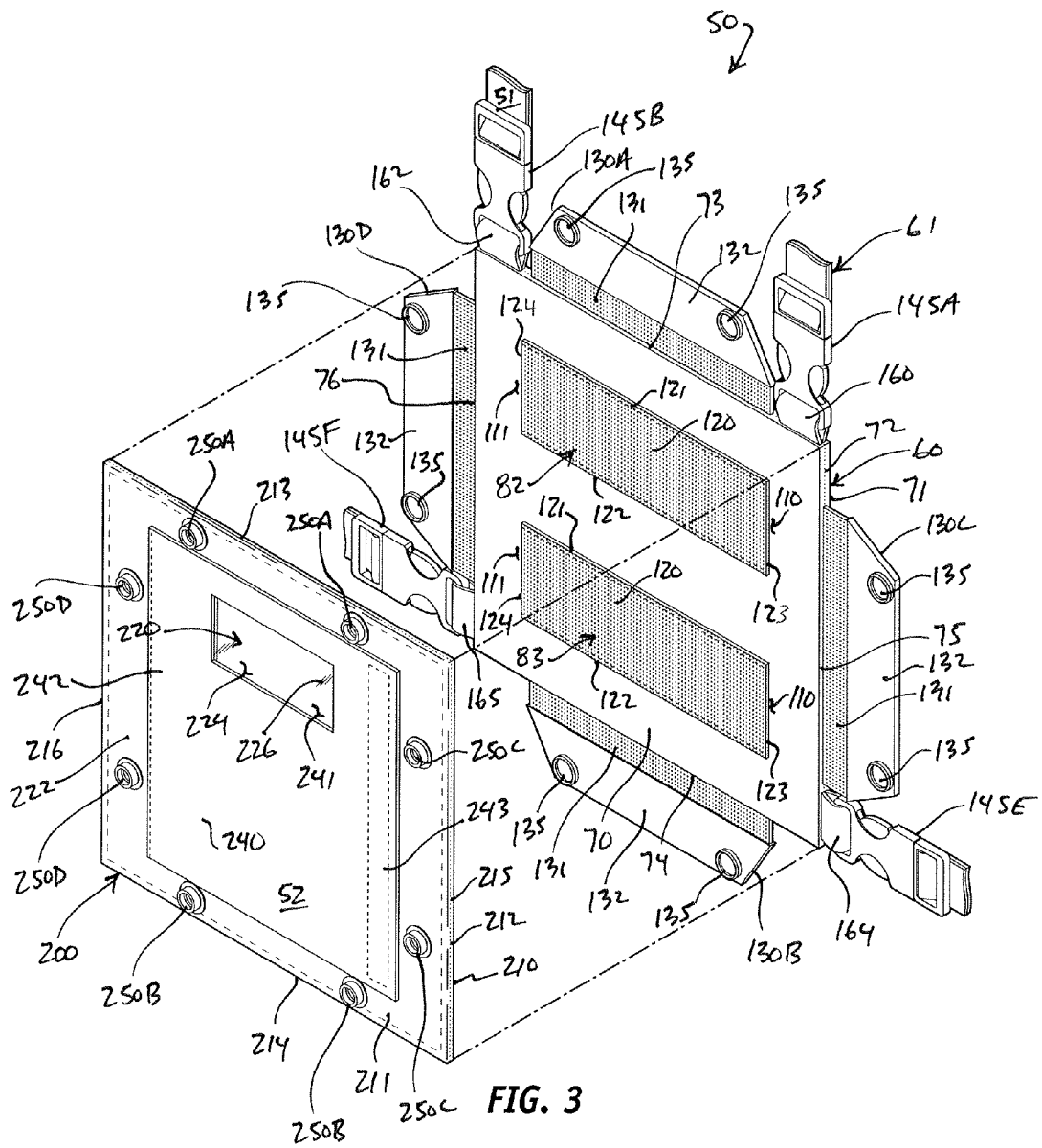
FIG. 3 is an enlarged front perspective view illustrating the pack detached from the base of the harness illustrated partially, the base being shown in an open position with upper and lower inner sleeves formed on an inner side of the base.
Figure 4:
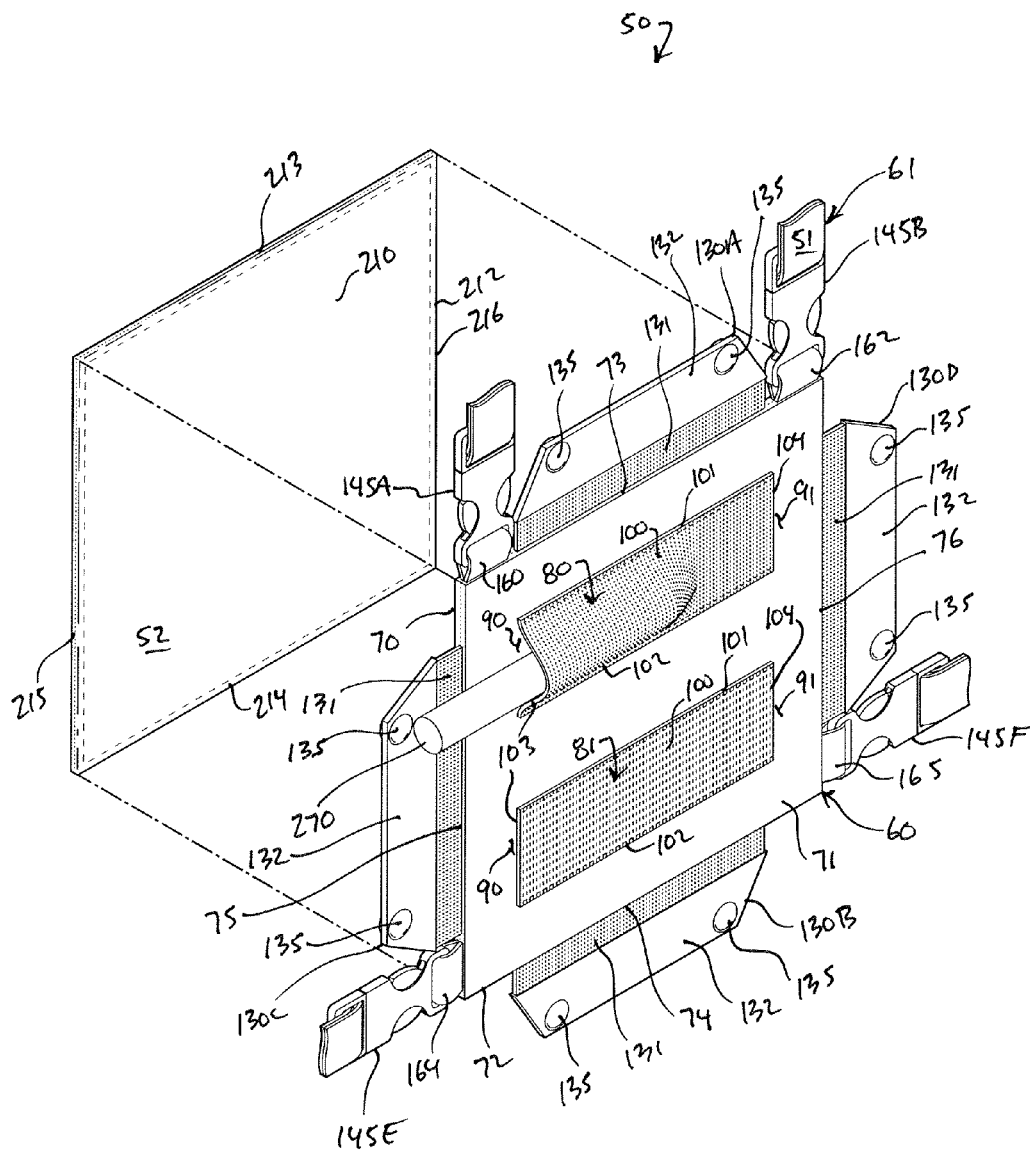
FIG. 4 is an enlarged rear perspective view corresponding to FIG. 3 illustrating a spacer partially inserted into the upper outer sleeve.
Figure 5:
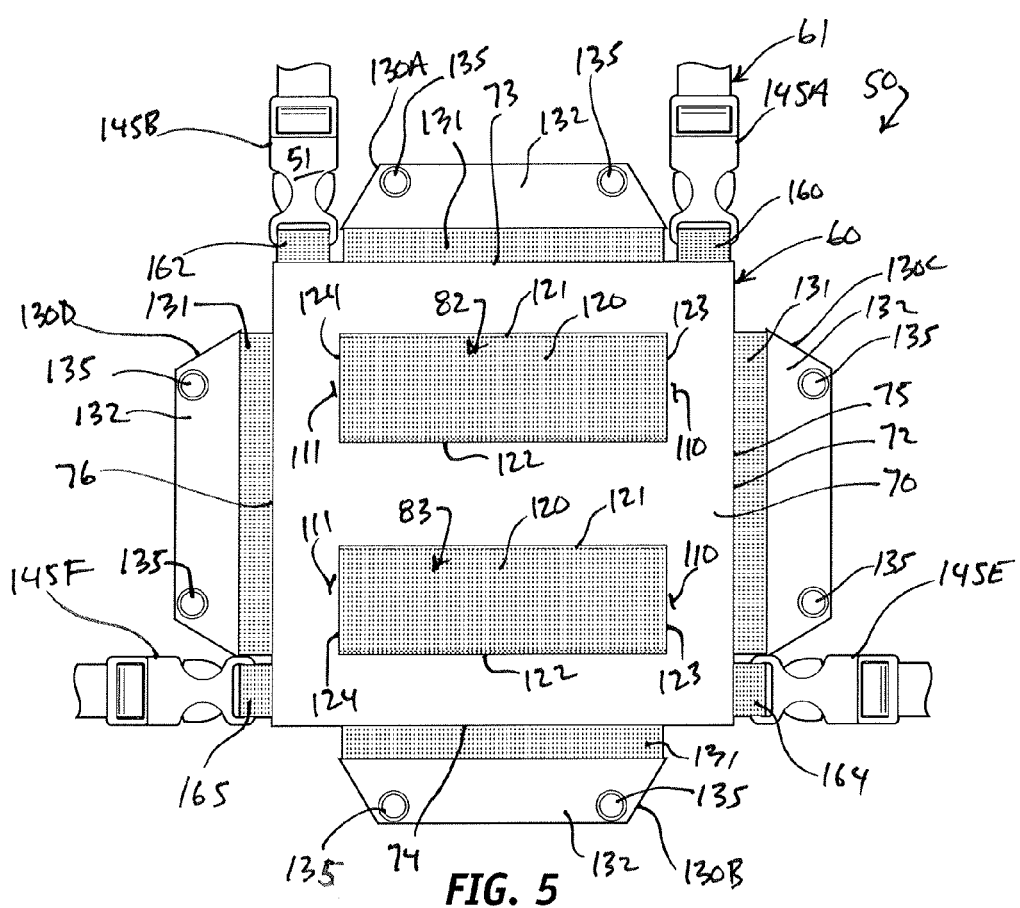
FIG. 5 is an enlarged front elevation view of the base corresponding to FIG. 3.
Figure 6:
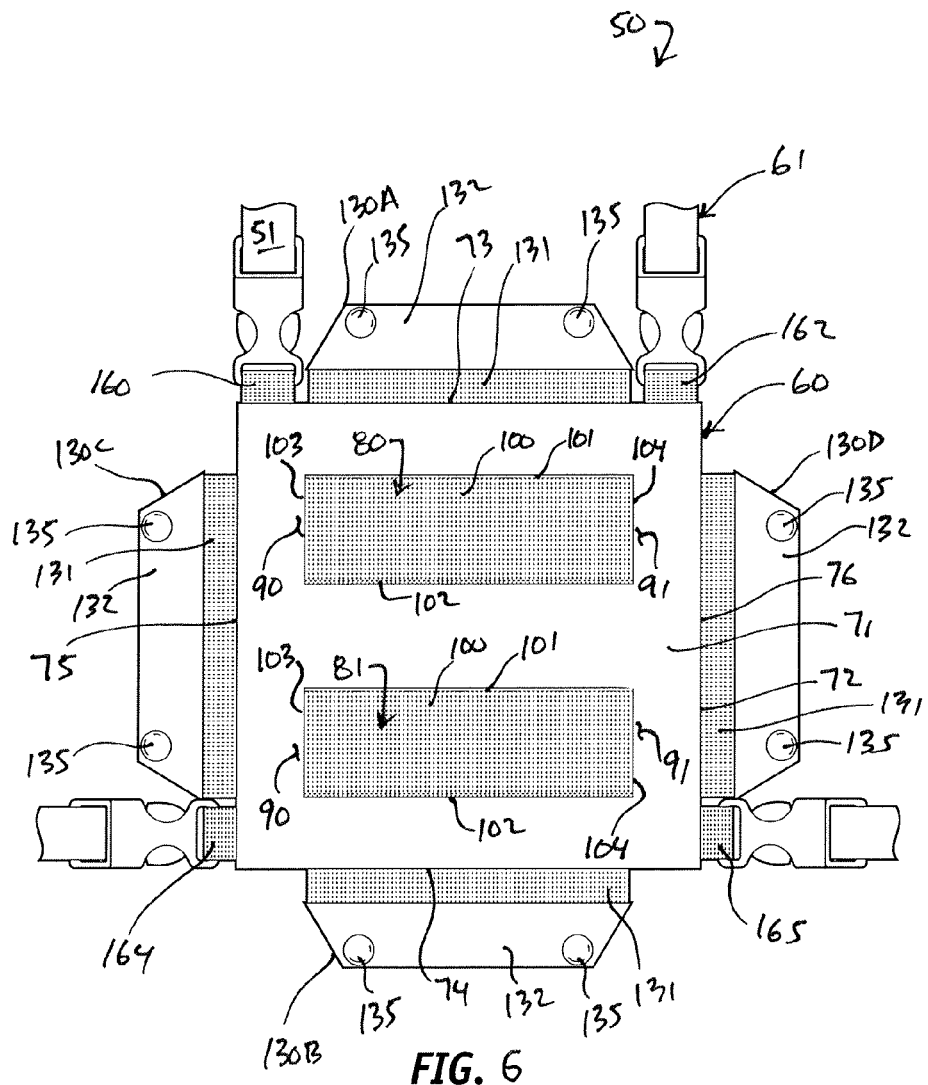
FIG. 6 is an enlarged rear elevation view of the base corresponding to FIG. 4.

FIG. 2 illustrates upper and lower outer sleeves 80 and 81 formed on outer side 71 of base 60, and FIG. 3 illustrates upper and lower inner sleeves 82 and 83 formed on inner side 70 of base 60. Upper and lower outer sleeves 80 and 81 are parallel relative to each other, are parallel relative to first and second end edges 73 and 74, are orthogonal relative to first and second side edges 75 and 76, and are each open toward first and second side edges 75 and 76 to enable the application and withdrawal of a spacer. Upper outer sleeve 80 is adjacent to first end edge 74, and lower outer sleeve 81 is adjacent to second end edge 74. Upper and lower inner sleeves 82 and 83 are parallel relative to each other, are parallel relative to first and second end edges 73 and 74, and are orthogonal relative to first and second side edges 75 and 76. Upper inner sleeve 82 is adjacent to first end edge 74, and lower inner sleeve 83 is adjacent to second end edge 74. Upper outer and inner sleeves 80 and 82 are diametrically opposed and parallel relative to each other, and lower outer and inner sleeves 81 and 83 are diametrically opposed and parallel relative to each other. Sleeves 80-83 are identical in structure, in size, and in shape.

Upper outer sleeve 80 is elongate, extends from first open end 90 near first side 75 to second open end 91 near second side edge 76. Upper outer sleeve 80 includes strap 100. Strap 100 is elongate and elastic being formed of elasticized material that can stretch and that can return to its original length, shape, etc., after being stretched. Strap 100 is applied across outer side 71, being parallel relative to first and second end edges 73 and 74 and orthogonal relative to first and second side edges 75 and 76, and include opposed, parallel upper and lower major edges 101 and 102 affixed to outer side 71, such as with stitching, adhesive, heat bonding, or the like, and opposed parallel first and second minor edges 103 and 104 that extend from upper major extremity 101 to lower major extremity 102. Upper outer sleeve 80 is defined by strap 100 and the portion of outer side 71 opposing strap 100. First and second minor edges 103 and 104 are not affixed or otherwise adhered to outer side 71, thereby forming first and second open ends 90 and 91, respectively. Lower outer sleeve 81 is identical in every respect to upper outer sleeve 80. Accordingly, the foregoing discussion of upper outer sleeve 80 applies in every respect to lower outer sleeve 81.

Upper inner sleeve 82 is elongate, extends from first open end 110 near first side 75 to second open end 111 near second side edge 76. Upper inner sleeve 82 includes strap 120. Like each strap 100, strap 120 is elongate and elastic being formed of elasticized material. Strap 120 is applied across inner side 70, being parallel relative to first and second end edges 73 and 74 and orthogonal relative to first and second side edges 75 and 76, and include opposed, parallel upper and lower major edges 121 and 122 affixed to inner side 70, such as with stitching, adhesive, heat bonding, or the like, and opposed parallel first and second minor edges 123 and 124 that extend from upper major extremity 121 to lower major extremity 122. Upper inner sleeve 82 is defined by strap 120 and the portion of inner side 70 opposing strap 120. First and second minor edges 123 and 124 are not affixed or otherwise adhered to outer side 71, thereby forming first and second open ends 110 and 111, respectively. Lower inner sleeve 83 is identical in every respect to upper inner sleeve 82. Accordingly, the foregoing discussion of upper inner sleeve 82 applies in every respect to lower inner sleeve 83.

Pack assembly 50 includes an engagement assembly for removably coupling pack 52 to base 60. The engagement assembly includes flaps 130 carried by base 60, and fasteners for securing flaps 130 releasably to pack 52. The fasteners, which are releasable fasteners, are snap fasteners in a preferred embodiment, and can be button fasteners, hook-and-loop fasteners, or the like in alternate embodiments.

In FIGS. 3, 4, 5, and 6, base 60 includes flaps 130 coupled to peripheral edge 72. Flaps 130 include flap 130A coupled to first end edge 73, flap 130B connected to second end edge 74, flap 130C coupled to first side edge 75, and flap 130D coupled to second side edge 76.

Flap 130A includes a proximal part 131, and a distal part 132. Proximal part 131 is coupled between first end edge 73 and distal part 132. Proximal part 131 is an elongate flap segment, is elastic being formed of elasticized material that can stretch and that can return to its original length, shape, etc., after being stretched, and is attached to first end edge 73 with stitching, adhesive, heat bonding, or the like, and extends outwardly from first end edge 73 to distal part 132 attached to proximal part 131 with stitching, adhesive, heat bonding, or the like. Distal part 132 is an elongate flap segment fashioned of leather, tightly woven nylon, canvas, or other material or combination of materials having the properties of flexibility, resilience, tear-resistance, and ruggedness, and extends outwardly from proximal part 131. Distal part 132 is formed with engagement or fastener elements 135 on either end thereof. Proximal part 131 elastically connects distal part 132 to peripheral edge 72, specifically first end edge 73. Flap 130A is centered between first and second side edges 75 and 76, and extends along a majority of the length of first end edge 73 from proximate to first side edge 75 to proximate to second side edge 76.

Flaps 130B-130D are identical to flap 130A in every respect, and the foregoing discussion of flap 130A applies to each of flaps 130B-130D. Briefly, flap 130B is centered between first and second side edges 75 and 76, extends along a majority of the length of second end edge 74 from proximate to first side edge 75 to proximate to second side edge 76, and includes proximal part 131 that extends outwardly from second end edge 74 to distal part 132 formed with engagement or fastener elements 135. Flap 130C is centered between first and second end edges 73 and 74, extends along a majority of the length of first side edge 75 from proximate to first end edge 73 to proximate to second end edge 74, and includes proximal part 131 that extends outwardly from first side edge 75 to distal part 132 formed with engagement or fastener elements 135. Flap 130D is centered between first and second end edges 73 and 74, extends along a majority of the length of second side edge 76 from proximate to first end edge 73 to proximate to second end edge 74, and includes proximal part 131 that extends outwardly from second side edge 76 to distal part 132 formed with engagement or fastener elements 135.

In FIGS. 1 and 2, strap system 61 is connected to base 60, is used to strap base 60 to the upper torso of the wearer, and includes left and right shoulder straps 140 and 141, left and right waist straps 142 and 143, and a back strap 144 interconnected with buckles 145 and looped connecting straps. Straps 140-144 are each fashioned of leather, tightly woven nylon, canvas, or other material or combination of materials having the properties of flexibility, resilience, tear-resistance, and ruggedness, and are conventionally length-adjustable straps. Each buckle 145 is a conventional slide release buckle including a male buckle member 146, the hook end, and a female buckle member 147, the catch end. In each buckle 145, male buckle member 146 includes a center guide rod forwardly extending from the front side with two spring arms equally spaced from the center rod. The two spring arms each have a retaining block that terminates at the front end. The female buckle member 147 has a front open side and two side holes which hold and secure the two spring arms of the male buckle member. This sort of buckle, which is commonly referred to as a parachute buckle, is found on backpacks, belts, rifle slings, boots, and a host of other common items.

Left and right shoulder straps 140 and 141 are connected to first end edge 73 on either side of flap 130A with respective buckles 145A and 145B, and extend rearwardly therefrom to respective buckles 145C and 145D coupled to a tie-down ring 150. Left waist strap 142 is connected to first side edge 75 alongside flap 130C near second end edge 74 with buckle 145E, and right waist strap 143 is connected to second side edge 76 alongside flap 130D near second end edge 74 with buckle 145F. Left and right waist straps 142 and 143 extend rearwardly from base 60 to respective buckles 145G and 145H coupled to either end of a connecting strap 151. Back strap 144 interconnects tie-down ring 150 and connecting strap 151. In this embodiment, back strap 145 is connected to tie-down ring 150 with buckle 145I, and extends downwardly therefrom to looped end 144A through which connecting strap 151 extends.

In the present embodiment, connecting strap 160 attached to first end edge 73 along the left side of flap 130A proximate to first side edge 75 is coupled to female buckle member 147 of buckle 145A. Male buckle member 146 of buckle 145A is coupled releasably to female buckle member 147 of buckle 145A, and left shoulder strap 140 extends rearwardly from male buckle member 146 of buckle 145A to male buckle member 146 of buckle 145C. Female buckle member 147 of buckle 145C is coupled releasably to male buckle member 146 of buckle 145C, and connecting strap 161 couples female buckle member 147 of buckle 145C to tie-down ring 150.

Connecting strap 162 attached to first end edge 73 along the right side of flap 130A proximate to second side edge 76 is coupled to female buckle member 147 of buckle 145B. Male buckle member 146 of buckle 145B is coupled releasably to female buckle member 147 of buckle 145B, and right shoulder strap 140 extends rearwardly from male buckle member 146 of buckle 145B to male buckle member 146 of buckle 145D. Female buckle member 147 of buckle 145D is coupled releasably to male buckle member 146 of buckle 145D, and connecting strap 163 couples female buckle member 147 of buckle 145D to tie-down ring 150.

Connecting strap 164 attached to first side edge 75 along the lower side of flap 130C proximate to second end edge 74 is coupled to female buckle member 147 of buckle 145E. Male buckle member 146 of buckle 145E is coupled releasably to female buckle member 147 of buckle 145E, and left waist strap 142 extends rearwardly from male buckle member 146 of buckle 145E to male buckle member 146 of buckle 145G. Female buckle member 147 of buckle 145G is coupled releasably to male buckle member 146 of buckle 145C, and female bucket member 147 of buckle 145G is coupled to the left end of connecting strap 151.

Connecting strap 165 attached to second side edge 76 along the lower side of flap 130D proximate to second end edge 74 is coupled to female buckle member 147 of buckle 145F. Male buckle member 146 of buckle 145F is coupled releasably to female buckle member 147 of buckle 145F, and right waist strap 143 extends rearwardly from male buckle member 146 of buckle 145F to male buckle member 146 of buckle 145H. Female buckle member 147 of buckle 145H is coupled releasably to male buckle member 146 of buckle 145H, and female bucket member 147 of buckle 145H is coupled to the right end of connecting strap 151.

Connecting strap 162 couples tie-down ring 150 to female buckle member 147 of buckle 145I. Male buckle member 146 of buckle 145I is coupled releasably to female buckle member 147 of buckle 145I, back strap 144 extends downwardly from male buckle member 146 of buckle 145I to connecting strap end 144A of back strap 144, and connecting strap end 144A of back strap 144 is coupled to connecting strap 151 between its left and right ends.

Figure 11:
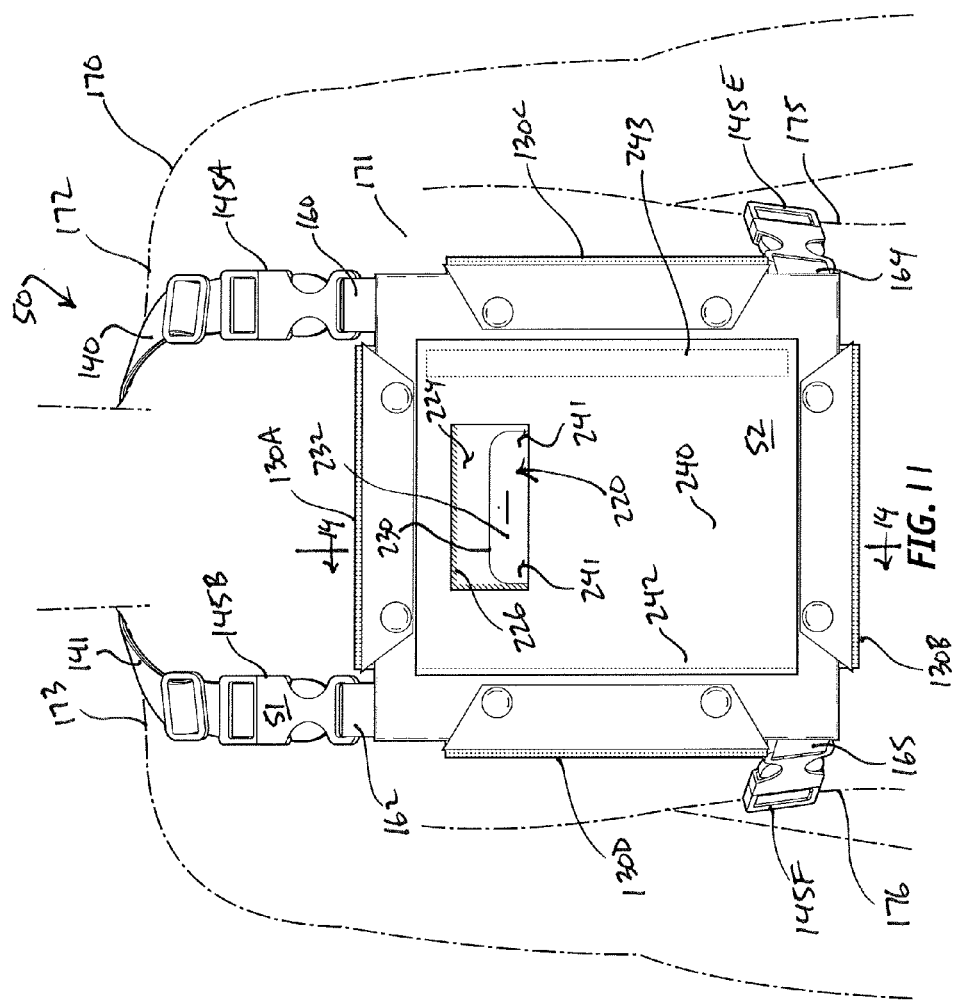
FIG. 11 is a front elevation view of the embodiment of FIG. 1 shown as it would appear being worn.
Figure 12:
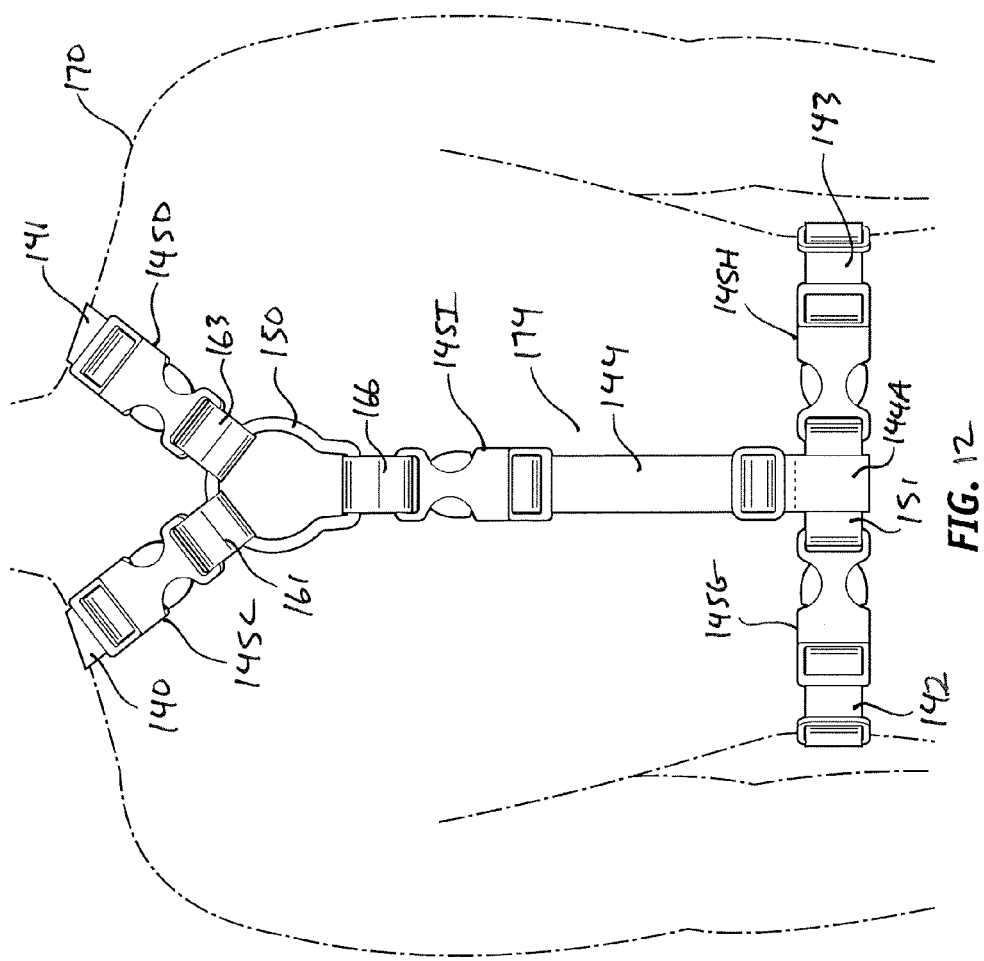
FIG. 12 is a rear elevation view corresponding to FIG. 11.

Referring in relevant part to FIGS. 11 and 12, inner side 70 of base 60 is positioned against chest 171 of the upper torso of human wearer 170, represented here as an adult human male as a matter of illustration and reference, left shoulder strap 140 extends over left shoulder 172 of wearer 170 from base 60 to tie-down ring 150 centered along the upper part of back 174 of wearer 170, right shoulder strap 141 extends over right shoulder 173 of wearer 170 from base 60 to tie-down ring 150 centered along the upper part of back 174 of wearer 170, left waist strap 142 extends over left waist 175 of wearer 170 from base 60 to connecting strap 151 centered along the lower part of back 174 of wearer 170, right waist strap 143 extends over right waist 176 of wearer 170 from base 60 to connecting strap 151 centered along the lower part of back 174 of wearer 170, and back strap 144 extends downwardly along the center of back 174 of wearer 170 from tie-down ring 150 to connecting strap 151, when harness 51 is worn by wearer 170. Male and female buckle members 146 and 147 of the respective buckles 145 can be selectively de-united and united to enable wearer 170 to put on harness 51. The lengths of straps 140-144 can be length-adjusted as needed in order fit harness 51 snugly/closely to wearer 170, especially on the outside of the wearers garment(s).

§ II. The Pack

Referring now in relevant part to FIGS. 2 and 3, pack 52 includes base 200, which, like base 60, is flat and generally square in overall shape and coextensive with respect to base 60. Base 200 is a panel assembly including, as seen in FIGS. 14-18, panel 201 covered with outer layering 202 consisting of one or more layers of material. Panel 201 is fashioned of plastic, wood, metal, or other material or combination of materials having an inherently stiff material characteristic, being inherently rigid or firm and resistant to bending. Outer layering 202 is fashioned of leather, tightly woven nylon, canvas, or other material or combination of materials having the inherent properties of flexibility, resilience, tear-resistance, and ruggedness. Panel 201 is upholstered with outer layering 202, which encloses panel 201 and defines the major sides and peripheral edge of base 200 as described below.

Referring in relevant part to FIGS. 2 and 3, base 200 includes inner side 210 and opposed outer side 211, and peripheral edge 212 defined by first end edge 213 and opposed second end edge 214, and first side edge 215 and opposed second side edge 216 that extend from the first end edge 213 to second end edge 214. First end edges 213 and 214 are parallel with respect to each other, and first and second side edges 215 and 216 are parallel with respect to each other and are orthogonal with respect to first and second end edges 213 and 214. Base 200 has a length from first end edge 213 to second end edge 214 and a width from first side edge 215 to second side edge 216, and the length of base 200 and the width of base 200 are substantially the same as the length of base 60 and the width of base 60 characterizing the generally square shape of base 200.

Figure 9:
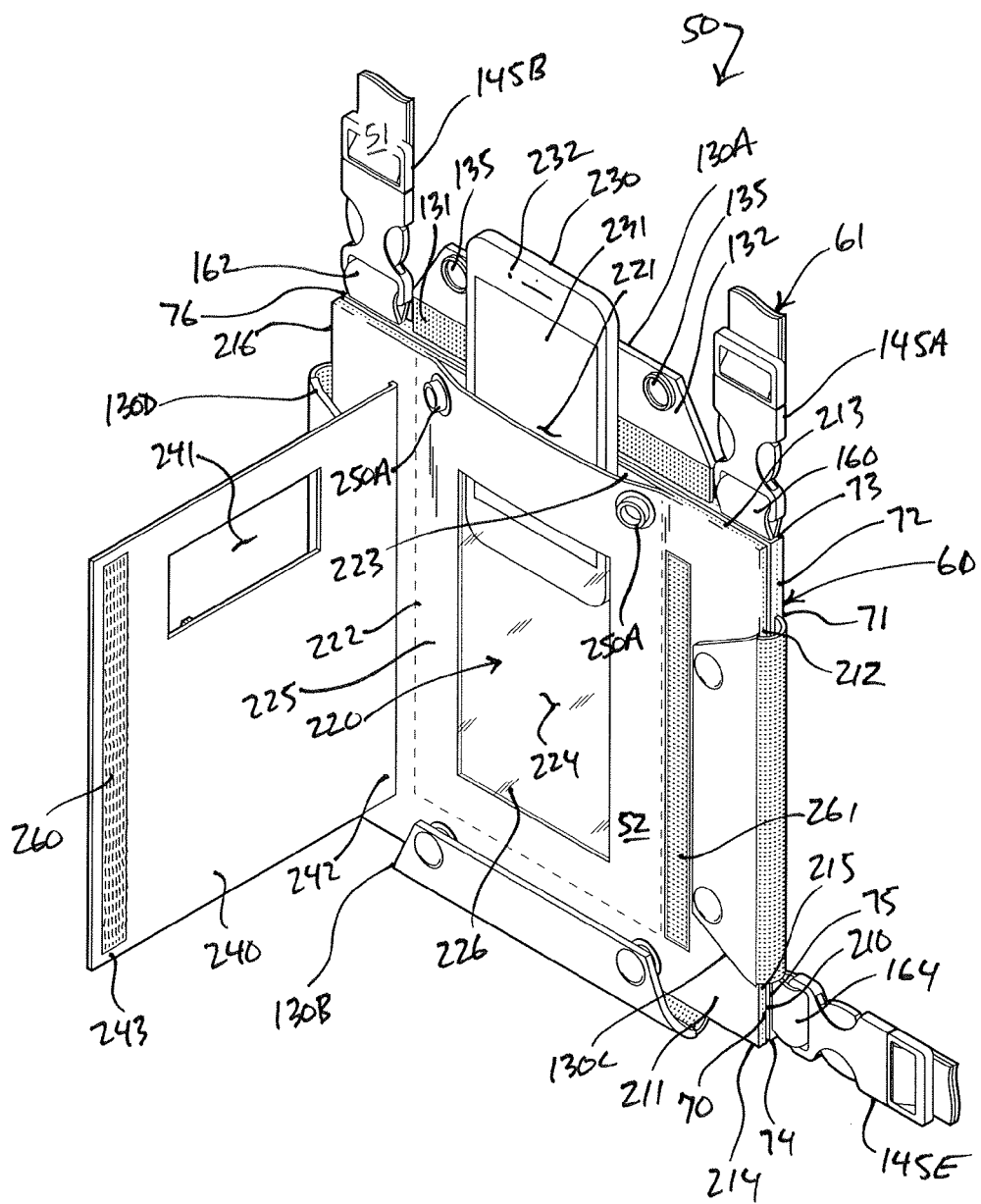
FIG. 9 is a front perspective view corresponding to FIG. 8 illustrating a door of pack in an open position revealing a windowed pocket of the pack, illustrating the base in a partially opened position opening an opening of the pack to the windowed pocket, and a mobile device as it would appear partially inserted into the windowed pocket through the opening, the mobile device including a touchscreen and a camera.

In FIG. 9, pack 52 is formed with windowed pocket 220, and pocket inlet 221 to windowed pocket 220. Windowed pocket 220 is formed in outer side 211, and is for receiving mobile device 230, having touchscreen 231 and camera 232, through pocket inlet 221 to windowed pocket 220 so as to juxtapose touchscreen 231 and the camera 232 with windowed pocket 220 to enable the viewing and the touching of touchscreen 231 and the taking of pictures and video with camera 232 in the operation of the mobile device from windowed pocket 220, when mobile device 230 is inserted into windowed pocket 220 in FIG. 19 through pocket inlet 221 in FIG. 9.

Windowed pocket 220 is formed in outer side 211 by a pair of outer and inner pocket panels of outer layering 201, including outer or first pocket panel 222 and inner or second pocket panel 223. First pocket panel 222 is superimposed atop, and is coextensive with respect to, second pocket panel 223. First and second pocket panels 222 and 223 are joined along their three edges at second end edge 214 and first and second side edges 215 and 216 of perimeter edge 212 of pack 52 and partially along their fourth edges at first end edge 213 of perimeter edge 212 of pack 52 so as to form pocket inlet 221 in first end edge 213. First and second pocket panels 222 and 223 are further joined along three sides to form the inside closed portion of windowed pocket 220 which extends into outer side 211 from pocket inlet 221 through first end edge 213 of peripheral edge 212. First and second pocket panels 222 and 223 are joined together with stitching, adhesive, heat bonding, or the like. Windowed pocket 220 is accessible through pocket inlet 221.

In FIG. 9, pocket inlet 221 to windowed pocket 220 is formed in first end edge 213 of peripheral edge 212. Pocket inlet 221 is centered or otherwise equidistant between first and second side edges 215 and 216. Windowed pocket 220 extends downwardly from pocket inlet 221 to proximate to second end edge 214, and is equidistant between first and second side edges 215 and 216. First pocket panel 222 of windowed pocket 220 includes window 224 framed by a peripheral edge border or frame of outer side 211. Window 224 is fitted with a thin sheet 226 of transparent material. Sheet 226 is thin in that it has a thickness of approximately 0.2-0.3 millimeters, and is formed of transparent flexible plastic that is affixed to and held by border 225, such as by heat bonding, an adhesive, stitching, or the like.

Figure 13:
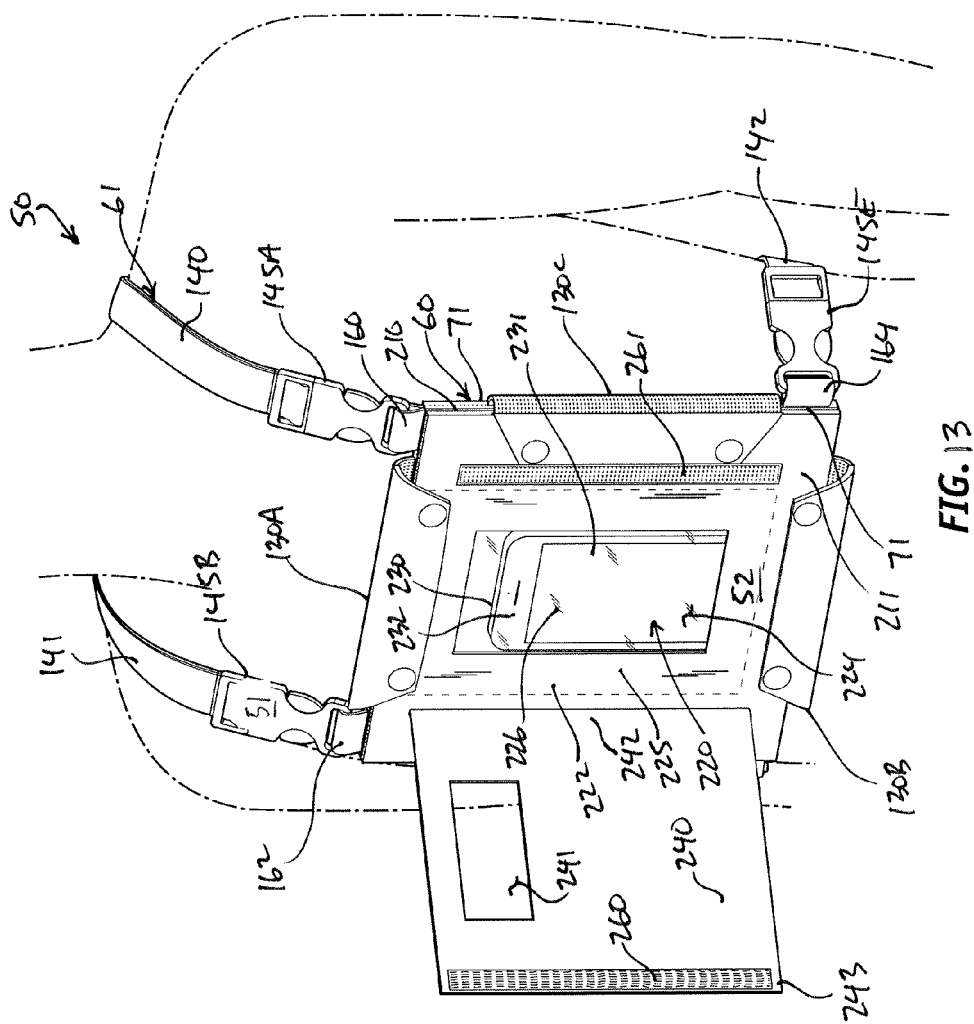
FIG. 13 is a front perspective view corresponding to FIGS. 10 and 11, illustrating the mobile device inserted into the windowed pocket with the touchscreen and the camera juxtaposed with the windowed pocket to enable the viewing and the touching of the touchscreen and the taking of pictures and video with the camera from the windowed pocket in the operation of the mobile device from the windowed pocket, when the door is in its open position relative to the windowed pocket.

Base 200 further includes a door 240. Door 240, like outer layering 202, is fashioned of leather, tightly woven nylon, canvas, or other material or combination of materials having the inherent properties of flexibility, resilience, tear-resistance, and ruggedness. Door 240 is flat and generally square in shape, is formed with window 241, is centered inboard of peripheral edge 212 and includes proximal extremity 242 mounted to outer pocket panel 222 of outer side 211 between second side edge 216 and windowed pocket 220, and an opposed distal extremity 243. Proximal extremity end 242 is mounted to first pocket panel 222 of outer side 221 with stitching, heat bonding, adhesive, or the like. The inherent material characteristics of door 240 enables door 240 to pivot at proximal extremity 242 between an open position away from windowed pocket 220 in FIGS. 9, 10, and 13, and a closed position over windowed pocket 220 in FIGS. 1, 2, 7, 8, and 11. Door 240 covers windowed pocket 220 and window 241 of door 240 is juxtaposed with a portion of windowed pocket 220, when door 240 is in the closed position. Furthermore, door 240 covers windowed pocket 220 over touchscreen 231 of mobile device 230 and window 241 of door 240 and windowed pocket 220 are juxtaposed enabling the taking of pictures and video with camera 232 from window 241 of door 240 and windowed pocket 220, when door 240 is in the closed position, when the mobile device 230 is received in windowed pocket 220, and when touchscreen 231 and camera 232 are juxtaposed with windowed pocket 220.

Figure 7:
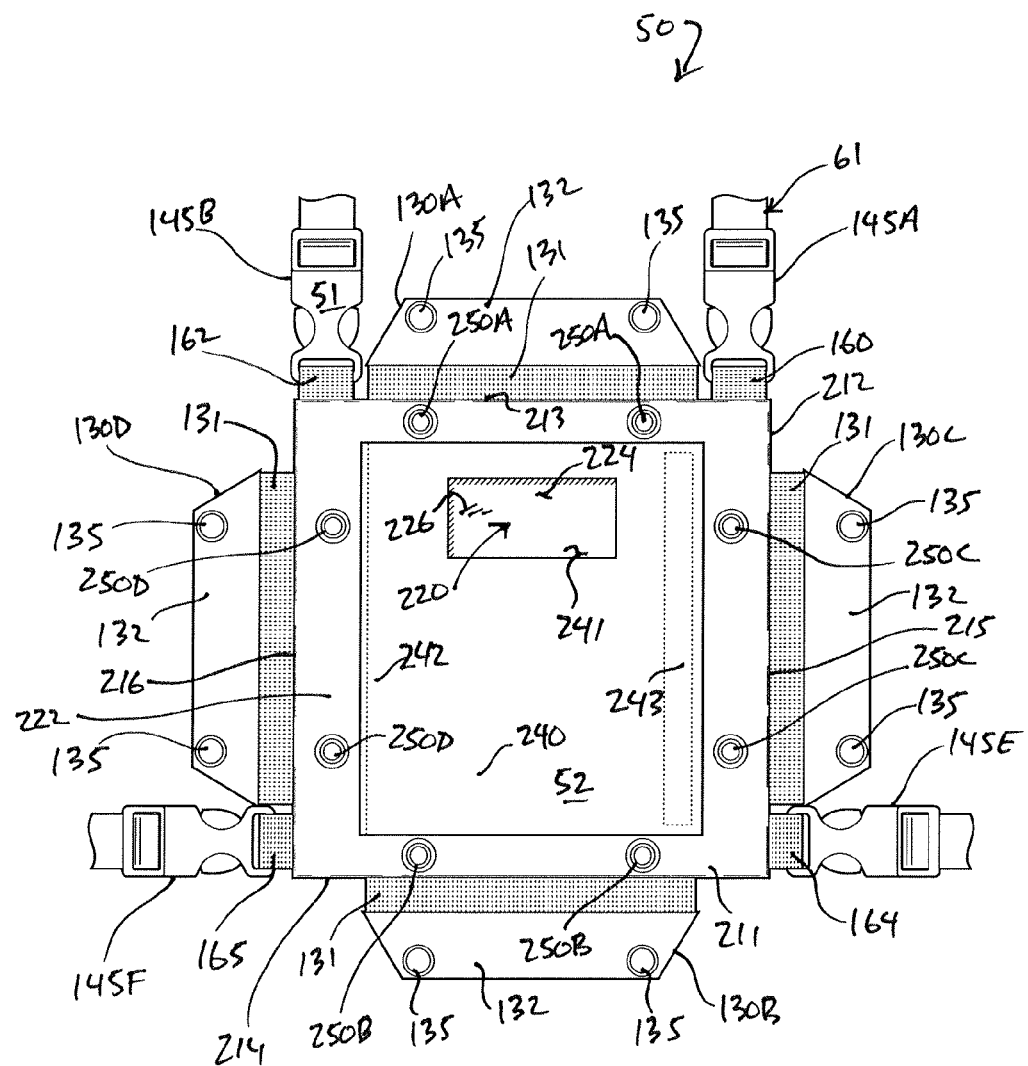
FIG. 7 is an enlarged front elevation view of the pack and the base corresponding to FIG. 3 illustrating the pack positioned on the inner side of the base.
Figure 8:
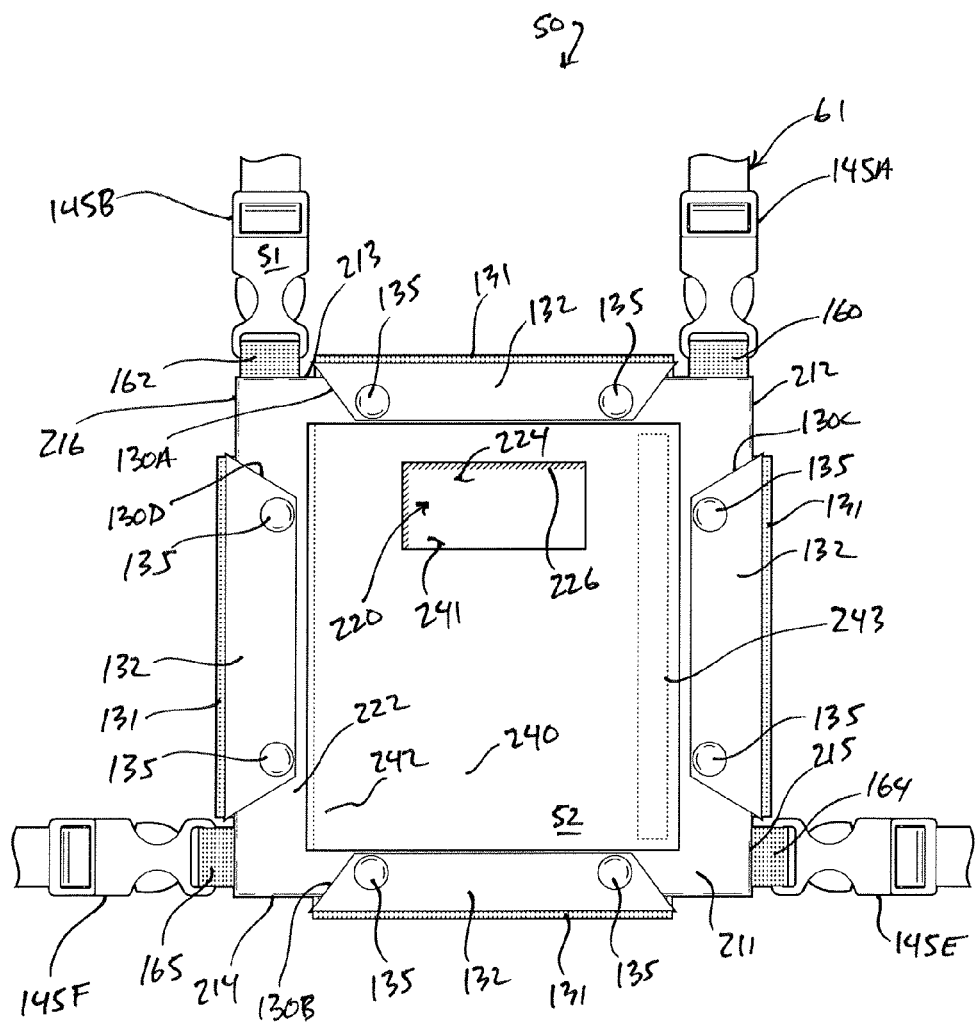
FIG. 8 is a front elevation view corresponding to FIG. 7 illustrating the base in a closed position removably attaching the pack to the base.

In FIGS. 3 and 7, first pocket panel 222 of outer side 211 is formed with complemental engagement or fastener elements 250, including complemental fastener elements 250A near first end edge 213 that are registered with the respective fastener elements 135 of flap 130A, complemental fastener elements 250B near second end edge 215 that are registered with the respective fastener elements 135 of flap 130B, complemental fastener elements 250C near first side edge 215 that are registered with the respective fastener elements 135 of flap 130C, and complemental fastener elements 250D near second side edge 216 that are registered with the respective fastener elements 135 of flap 130D. Complemental fastener elements 250 encircle windowed pocket 220, are between door 240 and peripheral edge 212, and encircle door 240 when door 240 is in its closed position. In this embodiment, fastener elements 135 of flaps 130 are female snap elements, and complemental fastener elements 250 are male snap elements, wherein each corresponding pair of fastener and complemental fastener elements is a snap fastener. The positioning of the fastener and complemental fastener elements 135 and 250 can be reversed in an alternate embodiment.

Door 240 and outer pocket panel 222 of outer side 211 of pack 52 incorporate a latch assembly for releasably securing door 240 to pack when door 240 is in its closed position, and which enables door 240 to be repeatedly opened and closed. The latch assembly includes a hook and loop fastener having an element 260 thereof carried by distal extremity 243 of door 240, and a complemental element 261 thereof carried by first pocket panel 222 of outer side 211 of pack 52 between windowed pocket 220 and complemental fasteners elements 250 corresponding to flap 130C. In this embodiment, element 260 is the hook element and element 261 is the loop element. This arrangement can be reversed without departing from the invention. In alternate embodiments, the latch assembly can include snap fasteners, a zipper fastener, etc.

Figure 10:
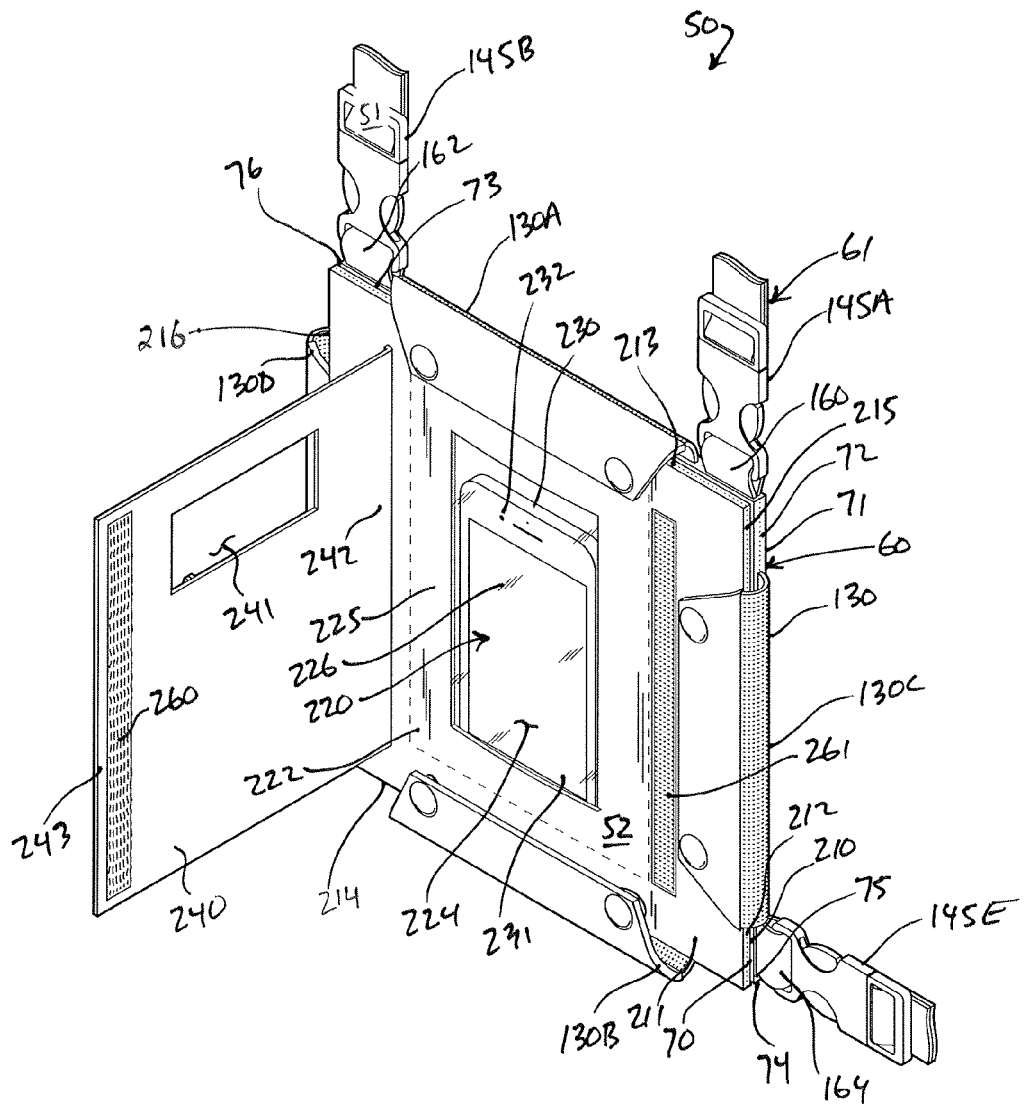
FIG. 10 is a front perspective view corresponding to FIG. 9 illustrating the base in its closed position, and illustrating the mobile device inserted into the windowed pocket with the touchscreen and the camera juxtaposed with the windowed pocket to enable the viewing and the touching of the touchscreen and the taking of pictures and video with the camera from the windowed pocket in the operation of the mobile device from the windowed pocket.

To employ pack 52 with mobile device 230 in FIGS. 9 and 10, mobile device 230 is taken up, such as by hand, and applied upright into windowed pocket 220 through pocket inlet 221 in FIG. 9 so as to juxtapose touchscreen 231 and camera 232 with windowed pocket 220 in FIG. 10 to enable the viewing and the touching of touchscreen 231 and the taking of still pictures and video with camera 232 in the operation of mobile device 230 via sheet 226 of transparent material of windowed pocket 220. The shape of windowed pocket 220 corresponds to the shape of mobile device 230 to ensure mobile device 230 is held snugly by windowed pocket 220. Again, mobile device 230 is oriented in place in windowed pocket 220 in an operative position so as to juxtapose touchscreen 231 and camera 232 with windowed pocket 220 to enable the viewing and touching of touchscreen 231 and the taking of pictures and video in the operation of mobile device 230 via sheet 226 of transparent material.

§ III. The Pack Assembly

Pack 52 is configured or otherwise adapted to be coupled to, and carried by, base 60 of harness 51. Base 60 of harness 51 is in an open position in FIG. 3-6 when pack 52 is detached from base 60 and when flaps 130 extend from peripheral edge 72 and fastener elements 135 are detached from complemental fastener elements 250 of pack 52. Referring in relevant part to FIGS. 7 and 14, to attach pack 52 to base 60 from the open position of base 60, inner side 210 of pack 52 is superimposed atop inner side 71 of base 60 positioning upper and lower inner sleeves 82 and 83 between inner side 210 of pack 52 and inner side 71 of base 60 and so as to juxtapose first end edge 213 of pack 52 with first end edge 73 of base 60, so as to juxtapose second end edge 214 of pack 52 with second end edge 74 of base 60, so as to juxtapose first side edge 215 of pack 52 with first side edge 75 of base 60, and so as to juxtapose second side edge 216 of pack 52 with second side edge 76 of base 60. After so positioning pack 52 on base 60, in which base 60 and pack 52 are axially aligned, base 60 is closed to releasably couple pack 52 to base 60. To close base 60 to releasably couple pack 52 to base 60 of harness 51, flap 130A is folded over first end edge 213 of pack 52 over pocket inlet 221 to windowed pocket 220 from first end edge 73 of base 60 to outer side 211 of pack 52 outboard of windowed pocket 220 and fasteners 135 of flap 130A and corresponding complemental fasteners 250A are snapped together releasably securing flap 130A to pack 52, flap 130B is folded over second end edge 214 of pack 52 from second end edge 74 of base 60 to outer side 211 of pack 52 outboard of windowed pocket 220 and fasteners 135 of flap 130B and corresponding complemental fasteners 250B are snapped together releasably securing flap 130B to pack 52, flap 130C is folded over first side edge 215 of pack 52 from first ide extremity 75 of base 60 to outer side 211 of pack 52 outboard of windowed pocket 220 and fasteners 135 of flap 130C and corresponding complemental fasteners 250C are snapped together releasably securing flap 130C to pack 52, and flap 130D is folded over second side edge 216 of pack 52 from second side edge 75 of base 60 to outer side 211 of pack 52 outboard of windowed pocket 220 and fasteners 135 of flap 130D and corresponding complemental fasteners 250D are snapped together releasably securing flap 130B to pack 52. The inherent flexible and elastic material characteristics of proximal parts 131 of flaps 130 enables flaps 130 to be so folded. And so when base 60 of harness 51 is closed relative to pack 52 and pack 52 is coupled releasably to base 60 and mobile device 230 is applied to windowed pocket 220, flap 130A extends over first end edge 213 of pack 52 over pocket inlet 221 to windowed pocket 220 from first end edge 73 of base 60 to outer side 211 of pack 52 outboard of windowed pocket 220 and fasteners 135 of flap 130A and corresponding complemental fasteners 250A are snapped together releasably securing flap 130A to pack 52 and flap 130A extends completely over and closes pocket inlet 221 to windowed pocket 220 in response entrapping mobile device 230 in windowed pocket 220 in FIG. 14, flap 130B extends over second end edge 214 of pack 52 from second end edge 74 of base 60 to outer side 211 of pack 52 outboard of windowed pocket 220 and fasteners 135 of flap 130B and corresponding complemental fasteners 250B are snapped together releasably securing flap 130B to pack 52, flap 130C extends over first side edge 215 of pack 52 from first ide extremity 75 of base 60 to outer side 211 of pack 52 outboard of windowed pocket 220 and fasteners 135 of flap 130C and corresponding complemental fasteners 250C are snapped together releasably securing flap 130C to pack 52, and flap 130D extends over second side edge 216 of pack 52 from second side edge 75 of base 60 to outer side 211 of pack 52 outboard of windowed pocket 220 and fasteners 135 of flap 130D and corresponding complemental fasteners 250D are snapped together releasably securing flap 130D to pack 52. To detach pack 52 from base 60, the foregoing pack 52 installation method need only be reversed. Pack 52 can be so repeatedly attached and detached relative to base 60. In an alternate embodiment, pocket opening 21 can be fashioned with a dedicated closure, such as a snap closure, a snap closure, a hook-and-loop closure, etc., useful for opening and closing pocket inlet 221 independently of flap 130A.

Flaps 130 can be opened and closed independently from one another. As a matter of example, in FIG. 9 flaps 130B-130D are shown as they would appear closed releasably securing pack 52 to base 60 of harness 51, whereas flap 130A is shown as it would appear open thereby opening the pocket inlet 221 to windowed pocket 220 to enable mobile device 23 to be selectively inserted into windowed pocket 220 through pocket inlet 221 and selectively withdrawn from windowed pocket 220 through pocket inlet 221, according to the principle of the invention.

When mobile device 230 is inserted into windowed pocket 220 and pack 52 is coupled removably to base 60 of harness 51 and door 240 is secured in its closed position in FIG. 1, pack assembly 50 is ready for use to employ mobile device 230 usefully as a body camera for taking still pictures and video with camera 232 for recording the wearer's interactions with the environment and others, according to the principle of the invention. Base 60 of harness 51 is configured to be positioned against the chest of the upper torso of the wearer for holding pack 52 ahead of the chest of the upper torso of the wearer with windowed pocket 220 facing outwardly relative to the chest of the upper torso of the wearer, when harness 51 is worn by the upper torso of the wearer in FIGS. 11 and 13. Referring again in relevant part to FIGS. 11 and 12, inner side 70 of base 60 positioned against chest 171 of wearer 170, left shoulder strap 140 extends over left shoulder 172 of wearer 170 from base 60 to tie-down ring 150 centered along the upper part of back 174 of wearer 170, right shoulder strap 141 extends over right shoulder 173 of wearer 170 from base 60 to tie-down ring 150 centered along the upper part of back 174 of wearer 170, left waist strap 142 extends over left waist 175 of wearer 170 from base 60 to connecting strap 151 centered along the lower part of back 174 of wearer 170, right waist strap 143 extends over right waist 176 of wearer 170 from base 60 to connecting strap 151 centered along the lower part of back 174 of wearer 170, and back strap 144 extends downwardly along the center of back 174 of wearer 170 from tie-down ring 150 to connecting strap 151, when harness 51 is worn by wearer 170. From this position, door 240 can be selectively opened in FIG. 13 to enable wearer 170 to view and touch touchscreen 231 and take pictures and video with camera 232 in the operation of mobile device 230 via sheet 226 of transparent material of windowed pocket 220 as a body camera for recording the wearer's interactions with the environment and others with camera 232. Furthermore, door 240 partially covers windowed pocket 220 and protects mobile device 230 applied therein and window 241 of door 240 and windowed pocket 220 are juxtaposed for enabling the use of mobile device 230 as a body camera, namely, for the taking of pictures and video with camera 232 from window 241 of door 240 and windowed pocket 220 via sheet 226 of transparent material in the operation of mobile device 230, when door 240 is in the closed position, when the mobile device 230 is received in windowed pocket 220, and when touchscreen 231 and camera 232 are juxtaposed with windowed pocket 220 in FIG. 11.

FIG. 15 is a view corresponding to FIG. 14 illustrating spacer 270 between pack 52 and base 60 of harness 51 interacting between pack 52 and base 60 tipping/tilting pack 52 downwardly relative to base 60 for concurrently tipping mobile device 230 held by pack 52 downwardly relative to base 60 when mobile device 230 is inserted into windowed pocket 220. In FIG. 15, spacer 270, which is an elongate dowel made of foam, wood, plastic, or the like, is inserted into, and held by, upper inner sleeve 82, through one of its first and second open ends 110 and 111 referenced in FIG. 3. Spacer 270 is inserted into upper inner sleeve 82 before pack 52 is coupled to base 60 of harness 51, by opening flap 130C and inserting spacer 270 into upper inner sleeve 82 through first open end 110 and then closing flap 130C, or by opening flap 130D and inserting spacer 270 into upper inner sleeve 82 through second open end 111 and then closing flap 130C, wherein flap 130A elastically extends via proximal part 131 in response to accommodate the separation between base 60 and pack via spacer 270 in upper inner sleeve 82, and the opposite flap 130B remains elastically constricted in response. Spacer 270 can be withdrawn from upper inner sleeve 82 by reversing this operation. The inherent elasticity of strap 120 of upper inner sleeve 82 enables spacer 270 to be advanced into upper inner sleeve 82 through either one of its first and second open ends 110 and 111 and held in place against inner side 70 by strap 120, and withdrawn from either one of its first and second open ends 110 and 111. When spacer 270 is inserted into upper inner sleeve 82, strap 120 elastically extends. When spacer 270 is withdrawn from upper inner sleeve 82, strap 120 elastically constricts. Pack 52 and mobile device 230 held by pack 52 are concurrently tipped/tilted downwardly relative to base 60 and relative to chest 171 of wearer 170 in FIG. 15 when spacer 270 is applied to upper inner sleeve 82, when mobile device 230 is carried by pack 52, when pack 52 is coupled to base 60 of harness 51, and when harness 51 is worn by the upper torso of the wearer 170, so as to provide a selected down-angled field of view of camera 232 as desired by the wearer of pack assembly 50.

In FIG. 16, spacer 270 is between pack 52 and base 60 of harness 51 and interacts between pack 52 and base 60 tipping/tilting pack 52 upwardly relative to base 60 for concurrently tipping mobile device 230 held by pack 52 upwardly relative to base 60 when mobile device 230 is inserted into windowed pocket 220. In FIG. 16, spacer 270 is inserted into, and held by, lower inner sleeve 83, through one of its first and second open ends 110 and 111 referenced in FIG. 3. Spacer 270 is inserted into lower inner sleeve 83 before pack 52 is coupled to base 60 of harness 51, by opening flap 130C and inserting spacer 270 into lower inner sleeve 83 through first open end 110 and then closing flap 130C, or by opening flap 130D and inserting spacer 270 into lower inner sleeve 83 through second open end 111 and then closing flap 130C, wherein flap 130A elastically extends via proximal part 131 in response to accommodate the separation between base 60 and pack via spacer 270 in lower inner sleeve 83, and the opposite flap 130B remains elastically constricted in response. Spacer 270 can be withdrawn from lower inner sleeve 83 by reversing this operation. The inherent elasticity of strap 120 of lower inner sleeve 83 enables spacer 270 to be advanced into lower inner sleeve 83 through either one of its first and second open ends 110 and 111 and held in place against inner side 70 by strap 120, and withdrawn from either one of its first and second open ends 110 and 111. When spacer 270 is inserted into lower inner sleeve 823 strap 120 elastically extends. When spacer 270 is withdrawn from lower inner sleeve 83, strap 120 elastically constricts. Pack 52 and mobile device 230 held by pack 52 are concurrently tipped/tilted upwardly relative to base 60 and relative to chest 171 of wearer 170 in FIG. 15 when spacer 270 is applied to lower inner sleeve 83, when mobile device 230 is carried by pack 52, when pack 52 is coupled to base 60 of harness 51, and when harness 51 is worn by the upper torso of the wearer 170, so as to provide a selected up-angled field of view of camera 232 as desired by the wearer of pack assembly 50. Spacer 270 can be withdrawn from upper inner sleeve 82 simply by reversing the operation of installing it into upper inner sleeve 82, wherein In FIG. 17, spacer 270 is inserted into, and held by, upper outer sleeve 80, through one of its first and second open ends 90 and 91 referenced in FIG. 2. Spacer 270 is inserted into upper outer sleeve 80 before putting on pack assembly 50, or after pack assembly 50 is put on. The inherent elasticity of strap 100 of upper outer sleeve 80 enables spacer 270 to be advanced into upper outer sleeve 80 through either one of its first and second open ends 90 and 91 and held in place against outer side 71 by strap 100, and withdrawn from either one of its first and second open ends 90 and 91. When spacer 270 is inserted into upper outer sleeve 80, strap 100 elastically extends. When spacer 270 is withdrawn from upper outer sleeve 80, strap 100 elastically constricts. Spacer 270 interacts between chest 171 of wearer 170 concurrently tipping base 60 and pack 52 and mobile device 230 held by pack 52 downwardly relative to chest 171 of wearer 170 in FIG. 17 when spacer 270 is applied to upper outer sleeve 80, when mobile device 230 is carried by pack 52, when pack 52 is coupled to base 60 of harness 51, and when harness 51 is worn by the upper torso of the wearer 170, so as to provide a selected down-angled field of view of camera 232 as desired by the wearer of pack assembly 50.

In FIG. 18, spacer 270 is inserted into, and held by, lower outer sleeve 81, through one of its first and second open ends 90 and 91 referenced in FIG. 2. Spacer 270 is inserted into lower outer sleeve 81 before putting on pack assembly 50, or after pack assembly 50 is put on. The inherent elasticity of strap 100 of lower outer sleeve 81 enables spacer 270 to be advanced into lower outer sleeve 81 through either one of its first and second open ends 90 and 91 and held in place against outer side 71 by strap 100, and withdrawn from either one of its first and second open ends 90 and 91. When spacer 270 is inserted into lower outer sleeve 81, strap 100 elastically extends. When spacer 270 is withdrawn from lower outer sleeve 81, strap 100 elastically constricts. Spacer 270 interacts between chest 171 of wearer 170 concurrently tipping base 60 and pack 52 and mobile device 230 held by pack 52 upwardly relative to chest 171 of wearer 170 in FIG. 17 when spacer 270 is applied to lower outer sleeve 81, when mobile device 230 is carried by pack 52, when pack 52 is coupled to base 60 of harness 51, and when harness 51 is worn by the upper torso of the wearer 170, so as to provide a selected up-angled field of view of camera 232 as desired by the wearer of pack assembly 50, so as to provide a selected up-angled field of view of camera 232 as desired by the wearer of pack assembly 50.

Accordingly, spacer 270 can be selectively installed into upper outer sleeve 80 or upper inner sleeve 82 for providing a selected down-angled field of view of camera 232 as desired by the wearer of pack assembly 50. Furthermore, spacer 270 can be selectively installed into lower outer sleeve 81 or lower inner sleeve 83 for providing an selected up-angled field of view of camera 232 as desired by the wearer of pack assembly 50. The size of spacer 270 can be chosen to increase and decrease the down-angled and the up-angled field of view of camera 232 of mobile device 230.

§ IV. The Inflatable Bladders

Figure 19:
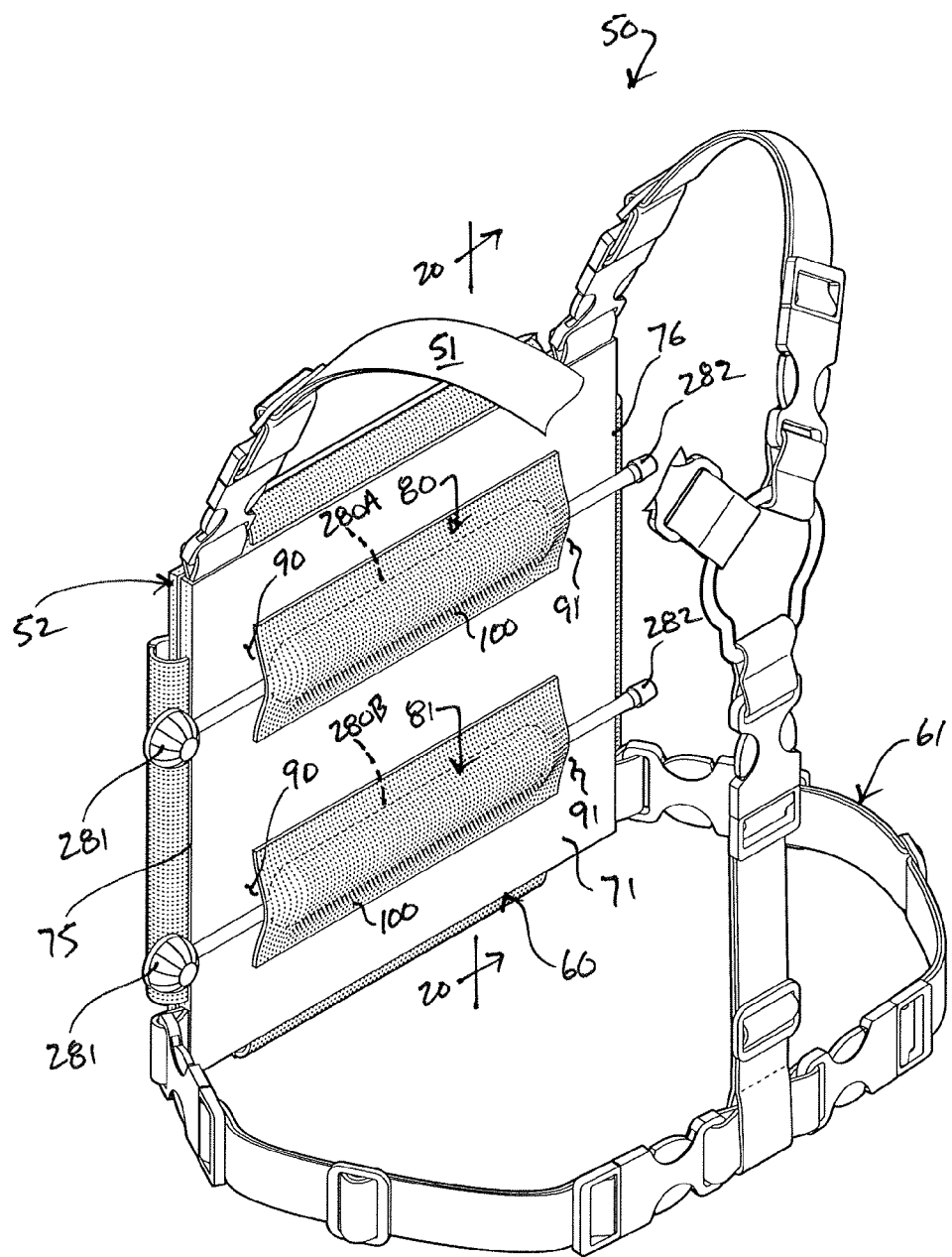
FIG. 19 is a rear perspective view corresponding to FIG. 2 illustrating upper and lower inflatable bladder inserted into the corresponding upper and lower outer sleeves.

FIG. 19 is a rear perspective view corresponding to FIG. 2 illustrating inflatable bladders 280 inserted into the respective upper and lower outer sleeves 80 and 81. Bladders 280 can be selectively inflated and deflated for selectively adjusting the field of view of camera 232 of mobile device 230 when mobile device 230 is carried by pack 52, when pack 52 is coupled to base 60 of harness 51, and when harness 51 is worn by the upper torso of the wearer 170, namely, for providing a selected up-angled or down-angled field of view of camera 232 as desired by the wearer of pack assembly 50.

Inflatable bladders 280 each include a pump 281 and a release valve 282. Pumps 281, operable by hand, are used to inflate the respective inflatable bladders 280. Release valves 282, operable by hand, are used to deflate the respective inflatable bladders 280.

Figures 20, 21, 22:
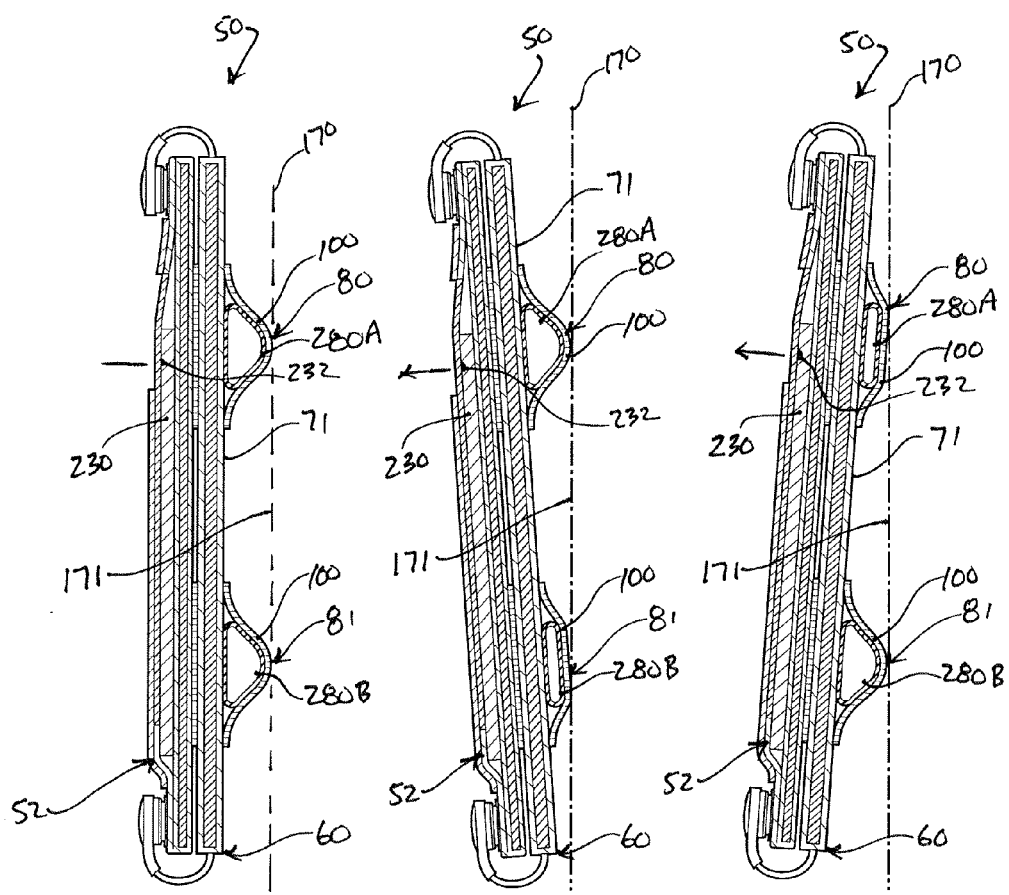
FIG. 20 is a section view taken along line 20-20 of FIG. 19.
FIG. 21 is a view corresponding to FIG. 20 illustrating the upper inflatable bladder in the upper outer sleeve of the base as it would appear inflated and the upper inflatable bladder in the lower outer sleeve of the base as it would appear deflated for concurrently tipping the base and the pack downwardly relative to a chest of an upper torso of a wearer, when the harness is worn by the upper torso of the wearer.
FIG. 22 is a view corresponding to FIG. 21 illustrating the upper inflatable bladder in the upper outer sleeve of the base as it would appear deflated and the upper inflatable bladder in the lower outer sleeve of the base as it would appear inflated for concurrently tipping the base and the pack upwardly relative to a chest of an upper torso of a wearer, when the harness is worn by the upper torso of the wearer.

In FIGS. 19 and 20, inflatable bladder 280A is inserted into, and is held by, upper outer sleeve 80, through one of its first and second open ends 90 and 91, in which inflatable bladder 280A extends outwardly from open end 90 to pump 281 outboard of first side edge 75 of base 60, and extends outwardly from open end 91 to release valve 182 outboard of second side edge 76 of base 60. The inherent elasticity of strap 100 of upper outer sleeve 80 enables inflatable bladder 280A to be advanced into upper outer sleeve 80 through either one of its first and second open ends 90 and 91 and held in place against outer side 71 by strap 100, and withdrawn from either one of its first and second open ends 90 and 91. Inflatable bladder 280B is inserted into, and is held by, lower outer sleeve 81, through one of its first and second open ends 90 and 91, in which inflatable bladder 280B extends outwardly from open end 90 to pump 281 outboard of first side edge 75 of base 60, and extends outwardly from open end 91 to release valve 182 outboard of second side edge 76 of base 60. The inherent elasticity of strap 100 of lower outer sleeve 81 enables inflatable bladder 280B to be advanced into lower outer sleeve 81 through either one of its first and second open ends 90 and 91 and held in place against outer side 71 by strap 100, and withdrawn from either one of its first and second open ends 90 and 91.

In FIGS. 19 and 20, inflatable bladders 280 are inflated in the respective upper and lower outer sleeves 80 and 81. In FIG. 21, inflatable bladder 280A is inflated in upper outer sleeve 80 and inflatable bladder 280B is deflated in lower outer sleeve 81. In FIG. 22, inflatable bladder 280A is deflated in upper outer sleeve 80 and inflatable bladder 280B is inflated in lower outer sleeve 81. When inflatable bladder 280A is inflated in upper outer sleeve 80 in FIGS. 19, 20, and 21, strap 100 of upper outer sleeve 80 elastically extends. When inflatable bladder 280A is deflated in upper outer sleeve 80 in FIG. 22, strap 100 of upper outer sleeve 80 elastically constricts. When inflatable bladder 280B is inflated in lower outer sleeve 81 in FIGS. 19, 20, and 212 strap 100 of lower outer sleeve 81 elastically extends. When inflatable bladder 280B is deflated in lower outer sleeve 81 in FIG. 22, strap 100 of upper outer sleeve 80 elastically constricts.

Inflatable bladders 280A and 280B interact between chest 171 of wearer 170 concurrently holding base 60 and pack 52 and mobile device 230 held by pack 52 parallel relative to chest 171 of wearer 170 in FIG. 20 when inflatable bladders 280 are inflated in the respective upper and lower outer sleeves 80 and 81, when mobile device 230 is carried by pack 52, when pack 52 is coupled to base 60 of harness 51, and when harness 51 is worn by the upper torso of the wearer 170, so as to provide a normal field of view of camera 232 as desired by the wearer of pack assembly 50. Inflatable bladder 280A interacts between chest 171 of wearer 170 concurrently holding tipping/tilting base 60 and pack 52 and mobile device 230 held by pack 52 downwardly relative to chest 171 of wearer 170 in FIG. 21 when inflatable bladder 280A is inflated in upper outer sleeve 80 and when inflatable bladder 280B is deflated in lower outer sleeve 81, when mobile device 230 is carried by pack 52, when pack 52 is coupled to base 60 of harness 51, and when harness 51 is worn by the upper torso of the wearer 170, so as to provide a down-angled field of view of camera 232 as desired by the wearer of pack assembly 50. Inflatable bladder 280B interacts between chest 171 of wearer 170 concurrently holding tipping/tilting base 60 and pack 52 and mobile device 230 held by pack 52 upwardly relative to chest 171 of wearer 170 in FIG. 21 when inflatable bladder 280B is inflated in lower outer sleeve 81 and when inflatable bladder 280A is deflated in upper outer sleeve 80, when mobile device 230 is carried by pack 52, when pack 52 is coupled to base 60 of harness 51, and when harness 51 is worn by the upper torso of the wearer 170, so as to provide a down-angled field of view of camera 232 as desired by the wearer of pack assembly 50. Accordingly, inflatable bladders 280A and 280B can be selectively inflated, partially inflated, and deflated in upper and lower outer sleeves 80 and 81, respectively, for selectively tipping/tilting mobile device 230 upwardly and downwardly for concurrently defining a selected field of view of camera 231 relative to chest 171 of wearer 170.

The invention has been described above with reference to illustrative embodiments. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

The invention claimed is:

1. A wearable pack assembly for a mobile device, the wearable pack assembly comprising:
   a harness, the harness includes a base;
   a pack carried by the base, the pack including:
      a windowed pocket having an opening for receiving a mobile device, having a touchscreen and a camera, so as to juxtapose the touchscreen and the camera with the windowed pocket to enable the viewing and the touching of the touchscreen and the taking of pictures and video with the camera in the operation of the mobile device from the windowed pocket; and a door having a window, the door being movable between an open position away from the windowed pocket and a closed position in which the door covers the windowed pocket over the touchscreen of the mobile device and the window of the door is positioned such that the camera of the mobile device is enabled to take pictures and video through the window and the windowed pocket;

wherein the harness positions the pack ahead of a chest of an upper torso of a wearer, with the windowed pocket facing outwardly relative to the chest of the upper torso of the wearer, when the harness is worn on the upper torso of the wearer.

2. The wearable pack assembly according to claim 1, further comprising an engagement assembly removably coupling the pack to the base.

3. The wearable pack assembly according to claim 2, wherein the engagement assembly comprises:
flaps carried by the base; and
fasteners releasably securing the flaps to the pack.

4. The wearable pack assembly according to claim 3, wherein one of the flaps closes the opening to the windowed pocket.

5. The wearable pack assembly according to claim 3, wherein each of the fasteners is a snap closure.

6. The wearable pack assembly according to claim 1, further comprising a spacer carried by the base, the spacer is configured to interact between the base and the chest of the upper torso of the wearer for concurrently tipping the base and the pack upwardly or downwardly relative to the chest of the upper torso of the wearer, when the harness is worn by the upper torso of the wearer.

7. The wearable pack assembly according to claim 6, wherein the base further includes a sleeve, and the spacer is held by the sleeve.

8. The wearable pack assembly according to claim 1, further comprising a spacer between the base and the windowed pocket, the spacer interacts between the base and the pocket tipping the pocket upwardly or downwardly relative to the base.

9. The wearable pack assembly according to claim 8, wherein the spacer is carried by the base.

10. The wearable pack assembly according to claim 9, wherein the base further includes a sleeve, and the spacer is held by the sleeve.

11. A wearable pack assembly for a mobile device, the wearable pack assembly comprising:
a harness, the harness includes a base including an inner side and an opposed outer side, and a peripheral edge;
a pack, the pack includes an inner side and an opposed outer side, a windowed pocket formed in the inner side, an opening to the windowed pocket, and a peripheral edge, the windowed pocket for receiving a mobile device, having a touchscreen and a camera, through the opening to the windowed pocket so as to juxtapose the touchscreen and the camera with the windowed pocket to enable the viewing and the touching of the touchscreen and the taking of pictures and video with the camera in the operation of the mobile device from the windowed pocket;
the inner side of the pack is superimposed atop the inner side of the base, and the peripheral edges of the respective pack is base are juxtaposed;
an engagement assembly removably coupling the pack to the base; and
the outer surface of the base is configured to be positioned against a chest of an upper torso of a wearer for holding the pack ahead of the chest of the upper torso of the wearer with the windowed pocket facing outwardly relative to the chest of the upper torso of the wearer, when the harness is worn by the upper torso of the wearer.

12. The wearable pack assembly according to claim 11, further comprising a door mounted to the pack for movement between an open position away from the windowed pocket and a closed position over the windowed pocket, the door covers the windowed pocket over the touchscreen of the mobile device and the window of the door and the windowed pocket are juxtaposed enabling the taking of pictures and video with the camera from the window of the door and the windowed pocket, when the door is in the closed position, when the mobile device is received in the windowed pocket, and when the touchscreen and the camera are juxtaposed with the windowed pocket.

13. The wearable pack assembly according to claim 12, further comprising a latch for releasably securing the door to the pack when the door is in the closed position, the latch assembly includes a hook and loop fastener having an element thereof carried by door and a complemental element thereof carried by the pack.

14. The wearable pack assembly according to claim 11, wherein the engagement assembly comprises:
flaps carried by the base, each of the flaps is elastic and extends over the peripheral edge of the pack from the base to the outer side of the pack; and
fasteners releasably securing the flaps to the outer side of the pack.

15. The wearable pack assembly according to claim 14, wherein one of the flaps closes the opening to the windowed pocket.

16. The wearable pack assembly according to claim 14, wherein each of the fasteners is a snap closure.

17. The wearable pack assembly according to claim 11, further comprising a spacer carried by the base, the spacer extends outwardly from the outer side of the base and is configured to interact between the base and the chest of the upper torso of the wearer for concurrently tipping the base and the windowed pocket upwardly or downwardly relative to the chest of the upper torso of the wearer, when the harness is worn by the upper torso of the wearer.

18. The wearable pack assembly according to claim 17, wherein the spacer is held against the outer side of the base with an elastic strap coupled to the outer side of the base.

19. The wearable pack assembly according to claim 11, further comprising a spacer between the inner side of the pack and the inner side of the base, the spacer interacts between the inner side of the pack and the inner side of the base tipping the pack upwardly or downwardly relative to the base.

20. The wearable pack assembly according to claim 19, wherein the spacer is carried by the base.

21. The wearable pack assembly according to claim 20, wherein the spacer is held against the inner side of the base with an elastic strap coupled to the inner side of the base.

22. A wearable pack assembly for a mobile device, the wearable pack assembly comprising:
a harness, the harness includes a base including an inner side and an opposed outer side, and a peripheral edge defined by a first end edge and an opposed second end edge, and a first side edge and an opposed second side edge that extend from the first end edge to the second end edge;

a pack, the pack includes an inner side and an opposed outer side, a windowed pocket formed in the inner side, an opening to the windowed pocket, and a peripheral edge defined by a first end edge and an opposed second end edge, and a first side edge and an opposed second side edge that extend from the first end edge to the end second extremity, the windowed pocket for receiving a mobile device, having a touchscreen and a camera, through the opening to the windowed pocket so as to juxtapose the touchscreen and the camera with the windowed pocket to enable the viewing and the touching of the touchscreen and the taking of pictures and video with the camera in the operation of the mobile device from the windowed pocket;

the inner side of the pack is superimposed atop the inner side of the base, the first end edge of the pack and the first end edge of the base are juxtaposed, the second end edge of the pack and the second end edge of the base are juxtaposed, the first side edge of the pack and the first side edge of the base are juxtaposed, and the second side edge of the pack and the second side edge of the base are juxtaposed;

the base further includes flaps, each of the flaps is elastic, a first one of the flaps extends over the first end edge of the pack from the first end edge of the base to the outer side of the pack outboard of the windowed pocket, a second one of the flaps extends over the second end edge of the pack from the second end edge of the base to the outer side of the pack outboard of the windowed pocket, a third one of the flaps extends over the first side edge of the pack from the first side edge of the base to the outer side of the pack outboard of the windowed pocket, and a fourth one of the flaps extends over the second side edge of the pack from the second side edge of the base to the outer side of the pack outboard of the windowed pocket;

fasteners releasably securing the first, second, third, and fourth flaps to the outer side of the pack outboard of the windowed pocket; and the outer surface of the base is configured to be positioned against a chest of an upper torso of a wearer for holding the pack ahead of the chest of the upper torso of the wearer with the windowed pocket facing outwardly relative to the chest of the upper torso of the wearer, when the harness is worn by the upper torso of the wearer.

23. The wearable pack assembly according to claim 22, wherein the first one of the flaps closes the opening to the windowed pocket.

24. The wearable pack assembly according to claim 22, wherein each of the fasteners is a snap closure.

25. The wearable pack assembly according to claim 22, further comprising a door mounted to the pack for movement between an open position away from the windowed pocket and a closed position over the windowed pocket, the door covers the windowed pocket over the touchscreen of the mobile device and the window of the door and the windowed pocket are juxtaposed enabling the taking of pictures and video with the camera from the window of the door and the windowed pocket, when the door is in the closed position, when the mobile device is received in the windowed pocket, and when the touchscreen and the camera are juxtaposed with the windowed pocket.

26. The wearable pack assembly according to claim 25, further comprising a latch for releasably securing the door to the pack when the door is in the closed position, the latch assembly includes a hook and loop fastener having an element thereof carried by door and a complemental element thereof carried by the pack.

27. The wearable pack assembly according to claim 22, further comprising a spacer carried by the base, the spacer extends outwardly from the outer side of the base and is configured to interact between the base and the chest of the upper torso of the wearer for concurrently tipping the base and the windowed pocket upwardly relative to the chest of the upper torso of the wearer, the first one of the flaps being elastically constricted and the second one of the flaps being elastically extended in response, when the harness is worn by the upper torso of the wearer.

28. The wearable pack assembly according to claim 27, wherein the spacer is held against the outer side of the base with an elastic strap coupled to the outer side of the base.

29. The wearable pack assembly according to claim 22, further comprising a spacer between the inner side of the pack and the inner side of the base, the spacer interacts between the inner side of the pack and the inner side of the base tipping the pack upwardly relative to the base, the first one of the flaps being elastically constricted and the second one of the flaps being elastically extended in response.

30. The wearable pack assembly according to claim 29, wherein the spacer is carried by the base.

31. The wearable pack assembly according to claim 30, wherein the spacer is held against the inner side of the base with an elastic strap coupled to the inner side of the base.

* * * * *